United States Patent
Cooley et al.

(10) Patent No.: US 9,786,027 B1
(45) Date of Patent: Oct. 10, 2017

(54) PREDICTIVE BI-ADAPTIVE STREAMING OF REAL-TIME INTERACTIVE COMPUTER GRAPHICS CONTENT

(71) Applicant: Waygate, Inc., Albany, CA (US)

(72) Inventors: Benjamin Cooley, Oakland, CA (US); Carlo Morgantini, Albany, CA (US)

(73) Assignee: Waygate, Inc., Albany, CA (US)

( * ) Notice: Subject to any disclaimer, the term of this patent is extended or adjusted under 35 U.S.C. 154(b) by 0 days.

(21) Appl. No.: 15/401,938

(22) Filed: Jan. 9, 2017

Related U.S. Application Data

(60) Provisional application No. 62/350,967, filed on Jun. 16, 2016.

(51) Int. Cl.
*G06T 1/20* (2006.01)
*G06T 15/00* (2011.01)
*H04L 29/06* (2006.01)

(52) U.S. Cl.
CPC .............. *G06T 1/20* (2013.01); *G06T 15/005* (2013.01); *H04L 65/60* (2013.01); *H04L 67/38* (2013.01)

(58) Field of Classification Search
None
See application file for complete search history.

(56) References Cited

U.S. PATENT DOCUMENTS

| | | | |
|---|---|---|---|
| 8,120,610 B1 * | 2/2012 | Stratton | G06F 17/30958 345/440 |
| 8,264,493 B2 | 9/2012 | Peterfreund | |
| 8,549,574 B2 | 10/2013 | Perlman et al. | |
| 8,826,357 B2 | 9/2014 | Fink et al. | |
| 9,171,396 B2 | 10/2015 | Jenkins | |
| 9,472,019 B2 | 10/2016 | Jenkins | |
| 9,489,762 B2 | 11/2016 | Jenkins | |
| 2002/0080143 A1 | 6/2002 | Morgan et al. | |
| 2006/0075106 A1 | 4/2006 | Hochmuth et al. | |

(Continued)

*Primary Examiner* — Yi Wang
(74) *Attorney, Agent, or Firm* — Bryan Cave LLP

(57) ABSTRACT

A method including playing a first interactive 3D simulation for a first 3D location of a computer graphics (CG) content clip for at least a first predetermined length of time. The method also includes, while playing the first interactive 3D simulation and within the first predetermined length of time, determining a first subset of the plurality of 3D assets to be downloaded for rendering two or more second 3D locations of the plurality of 3D locations; adapting the level of detail for one or more first 3D assets of the first subset of the plurality of 3D assets based at least in part on (a) a bandwidth for downloading the first subset of the plurality of 3D assets through the network, and (b) a processing power of the player device; and downloading the first subset of the plurality of 3D assets at the level of detail as adapted for the bandwidth and the processing power. The method additionally includes, after the first predetermined length of time, receiving a selection for a selected 3D location of the two or more second 3D locations. The method further includes playing a second interactive 3D simulation for the selected 3D location using at least a second subset of the first subset of the plurality of 3D assets, the second interactive 3D simulation being played devoid of delays for downloading and rendering the second interactive 3D simulation. Other embodiments are provided.

28 Claims, 16 Drawing Sheets

(56) References Cited

U.S. PATENT DOCUMENTS

| | | |
|---|---|---|
| 2012/0229445 A1 | 9/2012 | Jenkins |
| 2013/0097309 A1* | 4/2013 | Ma .................... H04L 29/08099 |
| | | 709/224 |
| 2013/0215115 A1 | 8/2013 | Jenkins |
| 2014/0095244 A1 | 4/2014 | Sagraves et al. |
| 2014/0274384 A1 | 9/2014 | Boswell et al. |
| 2014/0306991 A1* | 10/2014 | Kalai ........................ G06T 1/60 |
| | | 345/630 |
| 2014/0364215 A1 | 12/2014 | Mikhailov et al. |
| 2015/0134767 A1* | 5/2015 | L'Heureux ............. H04L 65/60 |
| | | 709/213 |
| 2015/0137352 A1 | 5/2015 | Chen et al. |
| 2015/0262421 A1 | 9/2015 | Bell et al. |
| 2015/0269770 A1 | 9/2015 | Jenkins |
| 2015/0373153 A1 | 12/2015 | Jenkins |
| 2016/0005214 A1 | 1/2016 | Jenkins |
| 2016/0098601 A1* | 4/2016 | Yang ................... G06K 9/00671 |
| | | 382/103 |
| 2016/0155260 A1 | 6/2016 | Jenkins |
| 2016/0163205 A1 | 6/2016 | Jenkins |

* cited by examiner

PREDICTIVE BI-ADAPTIVE STREAMING OF REAL-TIME INTERACTIVE COMPUTER GRAPHICS CONTENT

CROSS-REFERENCE TO RELATED APPLICATIONS

This application claims the benefit of U.S. Provisional Application No. 62/350,967, filed Jun. 16, 2016. U.S. Provisional Application No. 62/350,967 is incorporated herein by reference in its entirety.

TECHNICAL FIELD

This disclosure relates generally to authoring, distributing, and playing computer graphics content, and relates more particularly to predictive bi-adaptive streaming of real-time interactive computer graphics content.

BACKGROUND

Computer graphics (CG) content can be used in computing systems for interactive three-dimensional (3D) computer graphics. Conventional methods and system typically page CG content from local media (e.g., hard drive(s), optical discs, etc.) and render the CG content to create a 3D simulation on a video screen. Computing systems generally render the CG content at various levels of detail using processing hardware, such as a central processing unit (CPU) and/or a graphics processing unit (GPU).

BRIEF DESCRIPTION OF THE DRAWINGS

To facilitate further description of the embodiments, the following drawings are provided in which.

Figure 1:
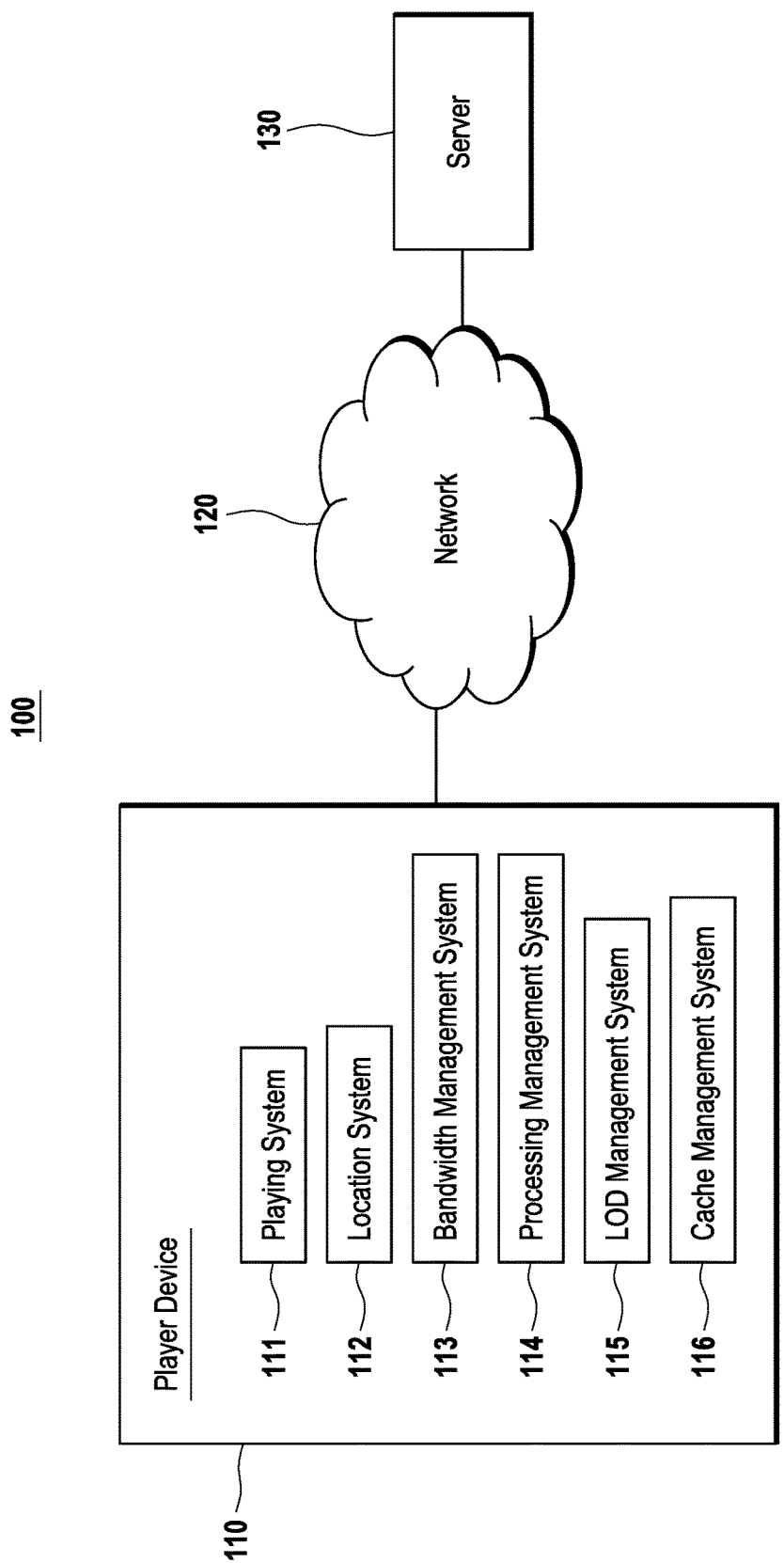
FIG. 1 illustrates a block diagram of a system that can be employed for predictive bi-adaptive streaming of real-time interactive CG content, according to an embodiment.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real-time" encompasses operations that occur in "near" real-time or somewhat delayed from a triggering event. In a number of embodiments, "real-time" can mean real-time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, five seconds, ten seconds, thirty seconds, one minute, or five minutes. In other embodiments, the time delay can be less than or equal to the rendering time for each framerate of content played. In still other embodiments, the time delay can be less than or equal to the target streaming time for downloading content.

DESCRIPTION OF EXAMPLES OF EMBODIMENTS

In various embodiments include a player device comprising one or more processing modules in data communication with a server through a network and one or more non-transitory memory storage modules storing computing instructions configured to run on the one or more processing modules and perform various acts. The acts can include playing a first interactive 3D simulation for a first 3D location of a computer graphics (CG) content clip for at least a first predetermined length of time, the CG content clip comprising a plurality of 3D locations renderable using a plurality of 3D assets each at a level of detail, and the plurality of 3D locations comprising the first 3D location. The acts further can include, while playing the first interactive 3D simulation and within the first predetermined length of time, determining a first subset of the plurality of 3D assets to be downloaded for rendering two or more second 3D locations of the plurality of 3D locations, the two or more second 3D locations being selectable options for playback directly subsequent to playing the first interactive 3D simulation for the first 3D location; adapting the level of detail for one or more first 3D assets of the first subset of the plurality of 3D assets based at least in part on (a) a bandwidth for downloading the first subset of the plurality of 3D assets through the network, and (b) a processing power of the player device; and downloading the first subset of the plurality of 3D assets at the level of detail as adapted for the bandwidth and the processing power. The acts also can include, after the first predetermined length of time, receiving a selection for a selected 3D location of the two or more second 3D locations. The acts additionally can include playing a second interactive 3D simulation for the selected 3D location using at least a second subset of the first subset of the plurality of 3D assets, the second interactive 3D simulation being played devoid of delays for downloading and rendering the second interactive 3D simulation.

A number of embodiments include a method being implemented on a player device via execution of computer instructions configured to run at one or more processing modules and configured to be stored at one or more non-transitory memory storage modules. The method can include playing a first interactive 3D simulation for a first 3D location of a computer graphics (CG) content clip for at least a first predetermined length of time, the CG content clip comprising a plurality of 3D locations renderable using a plurality of 3D assets each at a level of detail, and the plurality of 3D locations comprising the first 3D location. The method further can include, while playing the first interactive 3D simulation and within the first predetermined length of time, determining a first subset of the plurality of 3D assets to be downloaded for rendering two or more second 3D locations of the plurality of 3D locations, the two or more second 3D locations being selectable options for playback directly subsequent to playing the first interactive 3D simulation for the first 3D location; adapting the level of detail for one or more first 3D assets of the first subset of the plurality of 3D assets based at least in part on (a) a bandwidth for downloading the first subset of the plurality of 3D assets through the network, and (b) a processing power of the player device; and downloading the first subset of the plurality of 3D assets at the level of detail as adapted for the bandwidth and the processing power. The method also can include, after the first predetermined length of time, receiving a selection for a selected 3D location of the two or more second 3D locations. The method additionally can include playing a second interactive 3D simulation for the selected 3D location using at least a second subset of the first subset of the plurality of 3D assets, the second interactive 3D simulation being played devoid of delays for downloading and rendering the second interactive 3D simulation.

Additional embodiments include a system comprising one or more processing modules and one or more non-transitory memory storage modules storing computing instructions configured to run on the one or more processing modules and perform certain acts. The acts can include providing a user interface configured to allow a user to edit at least a portion of a computer graphics (CG) content clip comprising a plurality of 3D locations renderable using a plurality of 3D assets. The acts also can include receiving first user input comprising a selection of a first subset of the plurality of 3D assets to include in a first 3D location of the plurality of 3D locations. The acts additionally can include determining an aggregate bandwidth score and an aggregate processing score for the first 3D location including the first subset of the plurality of 3D assets, the aggregate bandwidth score being based at least in part on individual bandwidth scores for each of the first subset of the plurality of 3D assets, and the aggregate processing score being based at least in part on individual processing scores for each of the first subset of the plurality of 3D assets. The acts further can include displaying in the user interface information based at least in part on the aggregate bandwidth score and the aggregate processing score for the first subset of the plurality of 3D assets included in the first 3D location.

Further embodiments include a method being implemented via execution of computer instructions configured to run at one or more processing modules and configured to be stored at one or more non-transitory memory storage modules. The method can include providing a user interface configured to allow a user to edit at least a portion of a computer graphics (CG) content clip comprising a plurality of 3D locations renderable using a plurality of 3D assets. The method also can include receiving first user input comprising a selection of a first subset of the plurality of 3D assets to include in a first 3D location of the plurality of 3D locations. The method additionally can include determining an aggregate bandwidth score and an aggregate processing score for the first 3D location including the first subset of the plurality of 3D assets, the aggregate bandwidth score being based at least in part on individual bandwidth scores for each of the first subset of the plurality of 3D assets, and the aggregate processing score being based at least in part on individual processing scores for each of the first subset of the plurality of 3D assets. The method further can include displaying in the user interface information based at least in part on the aggregate bandwidth score and the aggregate processing score for the first subset of the plurality of 3D assets included in the first 3D location.

Turning to the drawings, FIG. 1 illustrates a block diagram of a system 100 that can be employed for predictive bi-adaptive streaming of real-time interactive CG content, according to an embodiment. System 100 is merely exemplary and embodiments of the system are not limited to the embodiments presented herein. The system can be employed in many different embodiments or examples not specifically depicted or described herein. In some embodiments, certain elements or modules of system 100 can perform various procedures, processes, and/or activities. In other embodiments, the procedures, processes, and/or activities can be performed by other suitable elements or modules of system 100.

Figure 18:
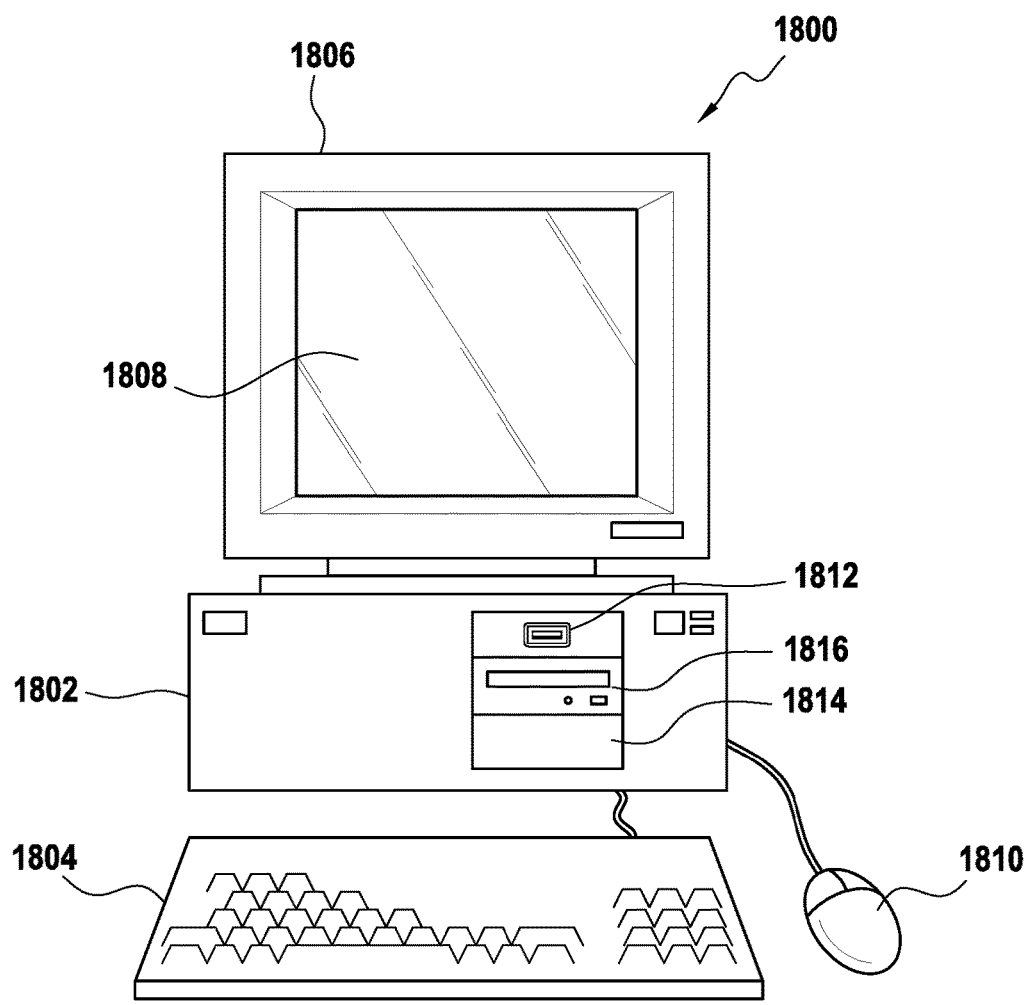
FIG. 18 illustrates a computer system, according to an embodiment.

In some embodiments, system 100 can include a player device 110, a network 120, and/or a server 130. Player device 110 can be a computer system, such as computer system 1800, as shown in FIG. 18 and described below, and can include hardware that is similar or identical to a video game console, a portable (e.g., handheld) game console, a virtual reality platform and/or virtual reality headset, a mobile computing device (e.g., a tablet computer, smartphone, etc.), a smart TV, a streaming device, a personal computer, a portable computer (e.g., laptop computer, notebook computer), or another suitable type of computer system. In a number of embodiments, player device 110 additionally can include one or more systems, such as a playing system 111, a location system 112, a bandwidth management system 113, a processing management system 114, a level of detail (LOD) management system 115, and/or a cache management system 116, as described below in further detail. In many embodiments, the systems (e.g., 111-116) of player device 110 can be software and/or hardware modules that implement the functions described herein.

In many embodiments, player device 110 can be in data communication with server 130 through network 120. Network 120 can be a local area network (LAN), a wireless LAN, a wide area network (WAN), a mobile telecommunications wireless data network, the Internet, another suitable network or digital communications medium, or a combination thereof.

In several embodiments, server 130 can be a computer system, such as computer system 1800, as shown in FIG. 18 and described below, and can be a single computer, a single server, a cluster or collection of computer or servers, or a cloud of computer or servers. In many embodiments, server 130 can be implemented through cloud computing, which can provide shared processing resources and data to computers and other suitable devices (e.g., player device 110) on demand via one or more remotely located data centers or other suitable remotely located computing resources through the Internet, which can beneficially provide ubiquitous, on-demand access to a shared pool of configurable computing resources. In various embodiments, server 130 can provide CG content to player device 110 on demand through network 120. For example, server 130 can include a central repository of data that can be served through network 120 to player device 110. In a number of embodiments, multiple player devices (e.g., 110) can be connected to server 130, such that server 130 can provide simultaneously stream various data to multiple player devices (e.g., 110). In some embodiments, server 130 can provide a streaming content hub, which can be an application accessible through a web browser or another application running on a device, such as player device 110). In many embodiments, the streaming content hub can be similar to Netflix, Hulu, Amazon Prime, iTunes, YouTube, or another streaming content hub, and can provide access to a library of content, such as video, audio, digital print (e.g., digital magazines, digital books), and/or other forms of consumable media content. In some embodiments, server 130 can provide a streaming content hub that provides access to various clips of 3D CG content.

In many embodiments, playing system 111 can render the data received to provide an interactive 3D simulation on a display, such as screen 1808, as shown in FIG. 18 and described below, or another suitable display. For example, the data served by server 130 through network 120 to player device 110 can include source assets, such as 3D assets, location assets, location graph assets, sound and/or music data, scripting programming code, and/or other suitable data used to provide an interactive 3D simulation. In several embodiments, 3D assets can include data for 3D models, such as textures, meshes, animation data, materials, physics data, shaders, character data (e.g., rigs), and/or other suitable digital data used to produce rendered 3D CG graphics. Playing system 111 can include a 3D CG rendering engine that can use one or more CPUs and/or GPUs to render the interactive 3D simulation using 3D CG rendering techniques, such as by using conventional 3D CG rendering techniques.

Interactive 3D simulations are significantly different than traditional two dimensional (2D) video streaming and 360-degree video streaming. Specifically, both two dimensional (2D) video streaming and 360-degree video streaming involve streaming of "linear" content. In other words, each frame or element of the video playback is defined sequentially, in a non-interactive fashion. For example, when a traditional 2D video is streamed, each frame of the video is presented in a predefined sequential order that is not affected by user interaction. 360-degree video streaming similarly involves a linear series of sequential frame-like elements. The difference from 2D video is that 360-degree video involves wider frame-like elements, such as spherical elements that are centered at the user's viewpoint, which can allow a user to choose a viewing portion (e.g., 60 degree wide viewing portion) from a "wrapped around" 360-degrees video. The user can interactively choose which viewing portions of the frame-like elements the user views as the video is played, but the frame-like elements are nonetheless streamed to be played sequentially in a manner than is not affected by user interaction. Interactive 3D simulations, by contrast, involve 3D assets that are rendered using 3D CG rendering, such that the playback of each frame is not linear but is instead based on the interactive choices of the user.

In many embodiments, the 3D assets can be provided by server 130 through network 120 to player device 110 "just in time," or by the time the 3D assets are needed for rendering the interactive 3D simulation. In many embodiments, system 100 can be used to render a real-time interactive 3D simulation, such that the interactive 3D simulation is played devoid of delays for downloading and rendering the interactive 3D simulation. For example, the particular 3D assets needed to render the interactive 3D simulation at a given location can be downloaded from server 130 through network 120 to player device 110 by the time player device 110 needs those particular 3D assets, such that the interactive 3D simulation plays devoid of delays for buffering, which can be referred to as real-time instant streaming. Additionally, player device 110 can render the 3D assets at the location within each framerate to provide the interactive 3D simulation, such that the interactive 3D simulation is played devoid of delays for rendering the interactive 3D simulation, which can be referred to as real-time rendering. Real-time rendering of CG content can allow a user to interact with the rendered CG content in real-time, such as moving in a location, manipulating objects, interacting with rendered characters, etc. with each frame being rendered in response to the user's interactions within a predefined framerate without delays beyond the predefined framerate.

Although the term "quality of service" is often used in network performance monitoring, and is typically based on error rates, bit rates, throughput, transmission delay, availability, jitter, etc., as used herein, however, "quality of service" (QOS) refers to the perceived quality of delivery and playback of the interactive 3D simulation, which can be based on whether the interactive 3D simulation is rendered with real-time instant streaming and real-time rendering, or instead involves delays for downloading and/or rendering. As used herein, a "constant QOS," refers to playback of the interactive 3D simulation that is devoid of delays for downloading and rendering. In several embodiments, player device 110 and/or server 130 can adapt the 3D assets so that player device 110 can render the interactive 3D simulation with real-time instant streaming and/or real-time rendering. As used herein, "bi-adaptive streaming" refers to providing constant QOS by adapting in response to two conditions (which are each potentially variable): (a) the conditions of network 120 (e.g., bandwidth, latency), and (b) the processing capabilities (e.g., processing power, graphics rendering power) of player device 110. In many embodiments, player device 110 can analyze these two conditions and adapt the 3D assets that are downloaded based on one or both of these two conditions to present a constant QOS.

In CG rendering, accounting for level of detail (LOD) can involve decreasing the complexity of a 3D asset representation as it moves away from the viewer or according to other metrics, such as object importance, viewpoint-relative speed or position, size of data, complexity, etc. LOD techniques can increase the efficiency of 3D CG rendering by decreasing the workload on graphics processing. The reduced visual quality of the 3D asset is often unnoticed because of the small effect on object appearance when distant or moving fast. In many embodiments, as described below in further detail, player device 110 can use LOD management system 115 to adapt the 3D assets that are downloaded to present a constant QOS by altering the LOD of the 3D asset to be downloaded.

In several embodiments, system 100 can provide predictive bi-adaptive streaming of real-time CG content through network 120 to provide interactive 3D experiences on player device 110. In many embodiments, various different types of player devices (e.g., player device 110) can play a piece of content with constant QOS. In a number of embodiments, player device 110 can play the content without locally storing all of the content at the same time. For example, unlike a conventional video game in which a game console stores the data (e.g., 3D assets and/or other source assets) for the content on local media, such as an optical disc (which can be referred to as a "local media model"), or in which the data for the content is downloaded to local storage prior to playing the game (which can be referred to as a "download model"), in many embodiments, player device 110 can play first portions of the content and meanwhile stream the data for second portions of the content to be played later, such that by the time the data for the second portions of the content is needed to be played, it is resident in local cache and available to be played (which can be referred to as a "streaming model").

In the streaming model, in several embodiments, player device 110 can store at any given time less data than is needed to play the entire content. For example, player device 110 can store in local cache the data needed to play the current portion of the content and can be streaming into local cache the portions of the content to be played next, but can evict from local cache (e.g., allow to be overwritten) the data that is no longer needed. Once data is delivered to player device 110 and is used for playing the interactive 3D simulation, the data can be evicted when no longer needed. This data can be referred to as "transient data." In some embodiments, player device 110 can include the software to stream and play the transient data, and that software can be resident on player device 110. For example, the software in player device 110 can include at least a portion of playing system 111, location system 112, bandwidth management system 113, processing management system 114, LOD management system 115, and/or cache management system 116.

In various embodiments, in order to provide constant QOS with no pauses or buffering, player device 110 can evaluate the bandwidth of network 120 and/or the processing power of player device 110 in order to adjust which content is streamed and how it is delivered. For example, player device can evaluate the bandwidth and processing power at various times, such as constantly, periodically, upon needing to stream data for a subsequent portion of the content, at other suitable times, or a combination thereof. In many embodiments, player device 110 can predictively determine which data (e.g., 3D assets and/or other source assets), will be needed and when it will be needed. In several embodiments, the predictive streaming can use probabilistic information about the future requirements of the streamed content in order to adjust and/or optimize for bandwidth usage, delivery time, and/or processing usage.

Figure 2:
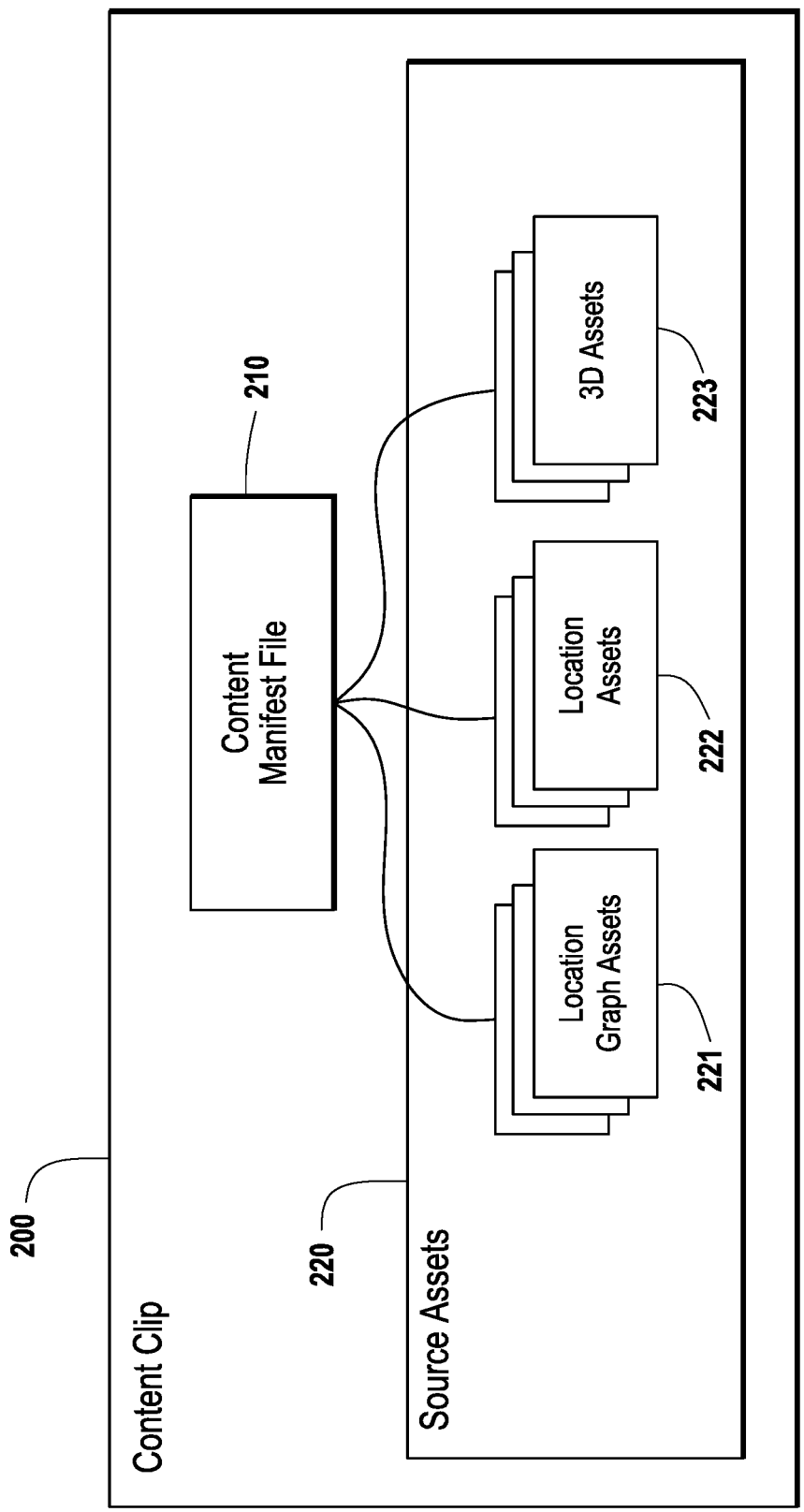
FIG. 2 illustrates a block diagram of a content clip, according to an embodiment.

Turning ahead in the drawings, FIG. 2 illustrates a block diagram of a content clip 200, according to an embodiment. Content clip 200 is merely exemplary and embodiments of the content clip are not limited to the embodiments presented herein. The content clip can be employed in many different embodiments or examples not specifically depicted or described herein. In some embodiments, certain elements of content clip 200 can be used to perform various procedures, processes, and/or activities. In other embodiments, the procedures, processes, and/or activities can be performed using other suitable elements of content clip 200.

Content clip 200 can represent a piece of content (referred to as a "clip"). A clip can be an individually selectable piece of content, such as an interactive game, an interactive show, etc. In many embodiments, content clip 200 can include a content manifest file 210 and source assets 220. In many embodiments, source assets 220 can include data files for source assets that are used by player device 110 (FIG. 1) to play the content, and can include location graph assets 221, location assets 222, 3D assets 223, and/or other suitable source assets. In several embodiments, content manifest file 210 can include identifiers of each of source assets 220. For example, content manifest file 210 can include a list of unique identifiers for each of source assets 220 that can be streamed to play the content represented by content clip 200, and/or an identification of a starting one of location graph assets 221.

In many embodiments, a user of player device 110 (FIG. 1) can select a clip of content that is available on server 130 (FIG. 1). After the user has selected to play the content, server 130 (FIG. 1) can stream the content to player device 110 (FIG. 1) through network 120 (FIG. 1) by downloading at various times various discrete data files. For example, player device 110 (FIG. 1) can first download content manifest file 210. In several embodiments, for each 3D asset in 3D assets 223, content manifest file 210 can include a globally unique identifier for the 3D asset, a hash of the data for the 3D asset (e.g., which can be used for versioning), a total size of the 3D asset (e.g. which can be used for bandwidth calculations), information about alternative versions for different LODs of the 3D asset (e.g., which can be used in determining bandwidth and/or processing limitations and/or for adapting LODs of the 3D asset for handling bandwidth and/or processing limitations), a processing score for each LOD of the 3D asset, and/or other suitable information about the 3D asset. Based on the data in content manifest file 210, player device 110 (FIG. 1) can determine which data files from among source assets 220 to downloaded next from server 130 (FIG. 1) in order to play the content, once it begins, without pauses or buffering.

Figure 3:
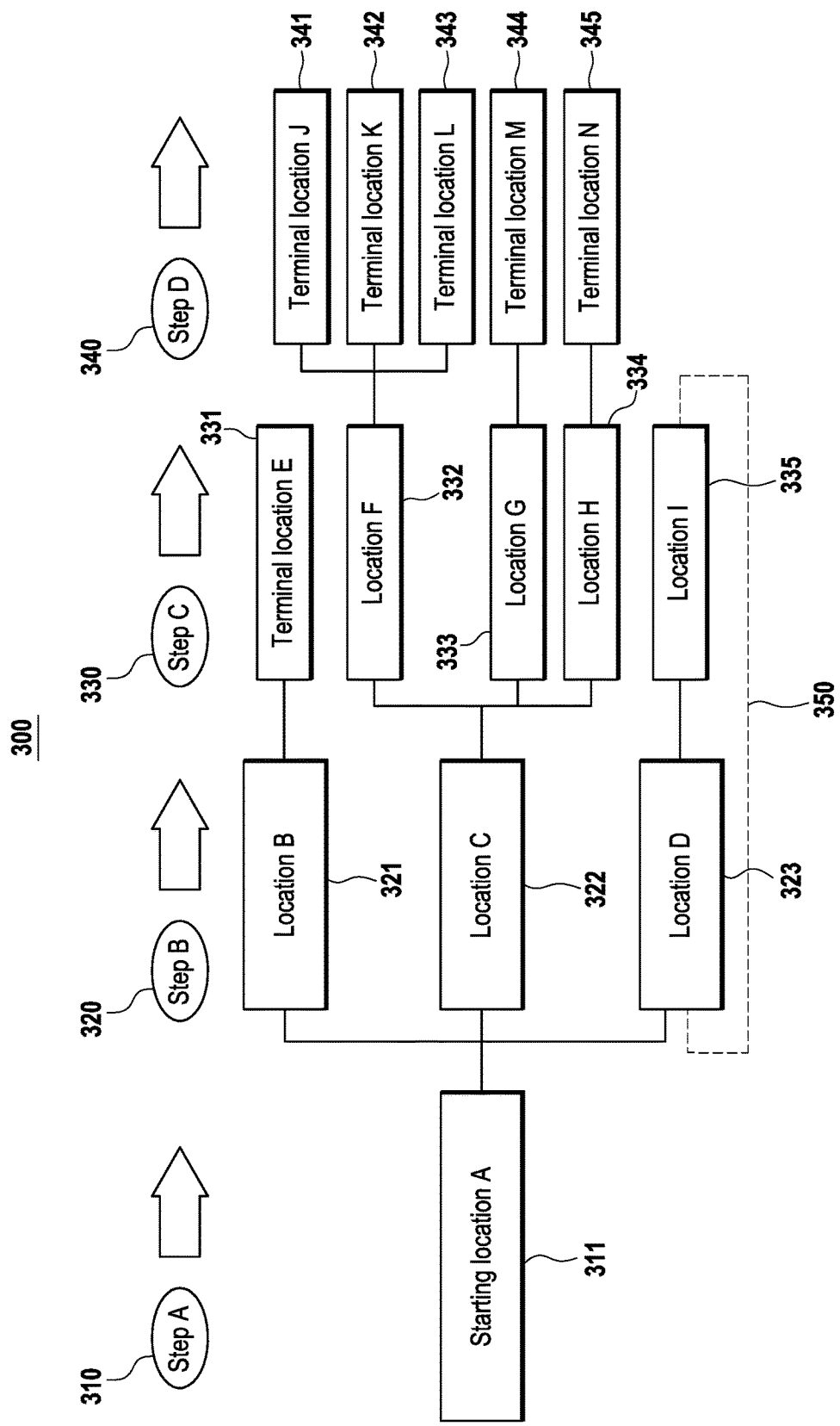
FIG. 3 illustrates a block diagram of a location graph, according to an embodiment.

Turning ahead in the drawings, FIG. 3 illustrates a block diagram of a location graph 300, according to an embodiment. Location graph 300 is merely exemplary and embodiments of the location graph are not limited to the embodiments presented herein. The location graph can be employed in many different embodiments or examples not specifically depicted or described herein. In many embodiments, location graph assets 221 (FIG. 2) can include one or more location graphs, such as location graph 300, which can describe the options for the high-level playback flow of the 3D content. In a number of embodiments, each of the location graphs (e.g., 300) can include one or more location nodes. For example, location graph 300 can include location nodes 311, 321-322, 331-334, and 341-345, which can be arranged in a directed flow along steps 310, 320, 330, and 340. Location nodes can each represent a location of the content that can be shown when playing a content clip (e.g., 200 (FIG. 2)).

In many embodiments, one or more of the location graph assets can be directed graphs, such as location graph 300, in which the movement among location nodes is directionally defined. In other embodiments, one or more of the location graph assets can be undirected graphs that allow movement along edges of the graph in any direction between location nodes connected by edges. As shown in FIG. 3, location graph 300 is a directed graph, in which flow is defined between location nodes connected by edges in a particular direction along steps 310 (step A), 320 (step B), 330 (step C), and 340 (step D). Flow can begin at step 310 (step A) with starting location node, such as location node 311 (representing starting location A), at which playback of starting location A can start. In many embodiments, the top location node (e.g., 311) of the location graph (e.g., 300) can represent the starting location for playback of the content. In several embodiments, the location graphs (e.g., 300) can provide a way to accurately predict which source assets will be needed during the streaming of the content clip (e.g., content clip 200 (FIG. 2)) in order to stream those assets in a manner than maintains constant QOS. In a number of embodiments, playback of the content clip can proceed by traversing the top location node to successive child nodes based on selections by the user as the user interactively navigates the interactive 3D locations portrayed in playback of the content clip, and location system 112 (FIG. 1) can manage the predictive loading of source assets to maintain constant QOS.

For example, as shown in location graph 300, after step 310 (step A), the flow can proceed to step 320 (step B), which includes the options of location node 321 (representing location B), location node 322 (representing location C), or location node 323 (representing location D). Location graph 300 can limit the options for flow after location node 311 (representing staring location A) to one of the child location nodes of location node 311, such that flow can be limited to either location node 321 (representing location B), location node 322 (representing location C), or location node 323 (representing location D). During playback of starting location A, location system 112 (FIG. 1) of player device 110 (FIG. 1) can determine, based on location graph 300, that any one of location B, location C, or location D could be chosen next by the user of player device 110 (FIG. 1). Based on this determination of the next possible location for playback, location system 112 (FIG. 1) can predictively load the source assets for location B, location C, and location D by streaming those source assets from server 130 (FIG. 1). If at the end of playback of location A, the user chooses to move to location C, for example, player device 110 (FIG. 1) can use the source assets for location C that were streamed to player device 110 (FIG. 1) during playback of location A to play location C. The source assets for locations B and D that were streamed to player device 110 (FIG. 1) during playback of location A can be evicted from local cache of player device 110 (FIG. 1).

As also shown in location graph 300, after step 320 (step B), the flow can proceed to step 330 (step C), which includes location node 331 (representing terminal location E), location node 332 (representing location F), location node 333 (representing location G), location node 334 (representing location H), and/or location node 335 (representing location I). Location graph 300 can limit the options for flow after location node 322 (representing location C) to one of the child location nodes of location node 322, such that flow can be limited to either location node 332 (representing location F), location node 333 (representing location G), or location node 334 (representing location H). During playback of location C, location system 112 (FIG. 1) of player device 110 (FIG. 1) can determine, based on location graph 300, that any one of location F, location G, or location H could be chosen next by the user of player device 110 (FIG. 1). Based on this determination of the next possible location for playback, location system 112 (FIG. 1) can predictively load the source assets for location F, location G, and location H by streaming those source assets from server 130 (FIG. 1). If at the end of playback of location C, the user chooses to move to location F, for example, player device 110 (FIG. 1) can use the source assets for location F that were streamed to player device 110 (FIG. 1) during playback of location C to play location F. The source assets for locations G and H that were streamed to player device 110 (FIG. 1) during playback of location C can be evicted from local cache of player device 110 (FIG. 1).

As further shown in location graph 300, after step 330 (step C), the flow can proceed to step 340 (step D), which includes location node 341 (representing terminal location J), location node 342 (representing terminal location K), location node 343 (representing terminal location L), location node 344 (representing terminal location M), and/or location node 345 (representing terminal location N). Location graph 300 can limit the options for flow after location node 332 (representing location F) to one of the child location nodes of location node 332, such that flow can be limited to either location node 341 (representing terminal location J), location node 342 (representing terminal location K), or location node 343 (representing terminal location L). During playback of location F, location system 112 (FIG. 1) of player device 110 (FIG. 1) can determine, based on location graph 300, that any one of terminal location J, terminal location K, or terminal location L could be chosen next by the user of player device 110 (FIG. 1). Based on this determination of the next possible location for playback, location system 112 (FIG. 1) can predictively load the source assets for terminal location J, terminal location K, and terminal location L by streaming those source assets from server 130 (FIG. 1). If at the end of playback of location F, the user chooses to move to terminal location K, for example, player device 110 (FIG. 1) can use the source assets for terminal location K that were streamed to player device 110 (FIG. 1) during playback of location F to play terminal location K. The source assets for terminal locations J and L that were streamed to player device 110 (FIG. 1) during playback of location F can be evicted from local cache of player device 110 (FIG. 1).

Location nodes representing terminal locations do not have child location nodes. Playback of the content clip can end at the end of playback of a terminal location. As such, after player device 110 (FIG. 1) plays terminal location K, the playback of the content ends. In a number of embodiments, playback of content clip can end when the user exits playback (e.g., the user choosing to exit playback, the user being forced to exit playback (e.g., losing a level), etc.), even before reaching the end of playback in a terminal location.

In a number of embodiments, the location graph can be a cyclic graph, which can include one or more cycles. In a cyclic graph, the user can return to previously visited locations. For example, location graph 300 can include an edge 350, which can provide a cycle such that if a user proceeds from starting location A to location D, then location I, flow will proceed next to location D, upon which the cycle can continue indefinitely until the user exits playback. A location D, location system 112 (FIG. 1) can predictively load the source assets for location I. At location I, location system 112 (FIG. 1) can predictively load the source assets for location D again. In some embodiments, location graphs can have no terminal location nodes, such that playback can continue (e.g., such as using cycles) until the user exist playback.

In some embodiments, there can be other arrangements of location graph assets than the type depicted in location graph 300. For example, a location graph can be used that includes nodes representing locations on a map, which can allow the user to move north, south, east, or west to adjacent nodes, or nodes corresponding to other spatial representations, such as a BSP (binary space partitioning) tree, an Octree, a Quadtree, a grid, or other suitable spatial representation data structures. Traversal of the location graph and predictive loading of source assets can proceed similarly as described above. In several embodiments, if the location graph is directed, traversal can proceed to successive child location nodes. At each location node, the source assets for the immediate child location nodes of the current location node can be predictively loaded until a terminal location node is played. In various embodiments, if the location graph is undirected, traversal can proceed to location nodes connected by an edge. At each location node, the source assets for the immediately adjacent location nodes of the current location node can be predictively loaded. In various embodiments there also can be more than one source node traversed to identify adjacent connected nodes if the set of all source nodes represent a single contiguous space in the simulation. For example the set of all source nodes which correspond to the current visible space in a BSP tree, Octree, Quadtree, grid or other spatial representation can be traversed.

As described above, location nodes can each represent a location of the content that can be shown when playing a content clip (e.g., 200 (FIG. 2)). For example, each location can be a discrete interactive 3D location similar to a movie "set" or "scene." As an example, a video game can begin a starting location A, which can be a living room of a house, for example. The living room can include a number of objects, such as chairs, characters (e.g., people), tables, TV, lights, animations of characters, etc., which can each be rendered using one or more 3D assets, which describe the geometry, texture, shading, etc. for the object. In the living room, the user can navigate in an interactive 3D simulation for at least a target streaming time. The target streaming time can be a minimum amount of time the user will spend in location A before moving to a subsequent location. In many embodiments, the target streaming time can be set by the author of the content clip (e.g., 200 (FIG. 2)). During the target streaming time, player device 110 (FIG. 1) can perform the predictive loading of source assets for the potential subsequent locations (e.g., the potential locations that can immediately succeed of the current location (e.g., starting location A) in the playback of content clip 200 (FIG. 2)). For example, upon entering location A, certain initial interactions can be provided to take at least the target streaming time, and the user can spend additional time in location A, if desired, before choosing to move to a subsequent location. From the great room, the user might have 3 options for subsequent location, such as a kitchen (location B), a hall (location C), or outside the back door (location D), for example. The source assets for these locations B, C, and D can be predictively loaded during the target streaming time in location A.

If the user chooses to proceed to the hall (location C), player device 110 (FIG. 1) can predictively load the source assets for the subsequent locations, such as a master bedroom (location F), and child's bedroom (location G), and a hallway bathroom (location H), during a target streaming time for minimum playback of location C. The target streaming time for location C can be similar or identical to the target streaming time for location A. The author of the content clip (e.g., 200 (FIG. 2)) can set the target streaming time for location C the same or different from the target streaming time for location A.

If the user chooses to proceed to the master bedroom (location F), player device can predictively load the source assets for the subsequent locations, such as a master closet (terminal location J), a master bathroom (terminal location K), or a master balcony (terminal location L), during target streaming time for minimum playback of location F. The target streaming time for location F can be similar or identical to the target streaming time for location A or location C. The user can then choose to proceed to one of the terminal locations, such as the master bathroom (terminal location K).

In several embodiments, each location represented by a location node (e.g., 311, 321-323, 331-335, 341-345) can be defined at least in part by one of location assets 222 (FIG. 2). For example, the location asset can include identification of certain source assets that define the location for playback through 3D rendering, such as 3D models of the location, sound and/or music data for the location, etc. When the user selects a content clip (e.g., 200 (FIG. 2)), player device 110 (FIG. 1) can stream the content manifest file (e.g., 210 (FIG. 2)), which can include a reference to a starting location graph asset, such as location graph 300. From location graph 300, location system 112 (FIG. 1) of player device 110 (FIG. 1) can determine that the top location node is location node 311 (representing starting location A), and can then stream the location asset of location assets 222 (FIG. 2) for starting location A. In some embodiments, the location asset for starting location A (of location assets 222 (FIG. 22)) can identify which 3D assets from 3D assets 223 are used in starting location A, and player device 110 (FIG. 1) can stream those 3D assets. In other embodiments, the source assets identified in content manifest file 210 (FIG. 2) can include location information, such that player device 110 (FIG. 1) can use content manifest file 210 (FIG. 2) to determine the source assets for the starting location A, such as the location asset (e.g., of location assets 222 (FIG. 2)) for the starting location and/or the 3D assets (e.g., of 3D assets 223 (FIG. 2)) for rendering the starting location.

In several embodiments, while the source assets used to render starting location A are streaming, player device 110 (FIG. 1) can display a buffering screen. In many embodiments, after the starting location (e.g., starting location A) has loaded and begins playback, player device 110 (FIG. 1) can play the content clip (e.g., 200 (FIG. 2)), including transitions to subsequent locations, with constant QOS and without delays for buffering or rendering. Subsequent locations do not require buffering because the source assets used to render each subsequent location can be predictively loaded before playback of the subsequent location begins, as described above. Predictively loading the next possible locations within the target streaming time for streaming at each location can facilitate player device 110 achieving constant QOS when playing the content clip (e.g., 200 (FIG. 2)). For example, in transitioning from location A to location C, player device 110 (FIG. 1) can continue uninterrupted playback without delays for buffering location C.

Figure 4:
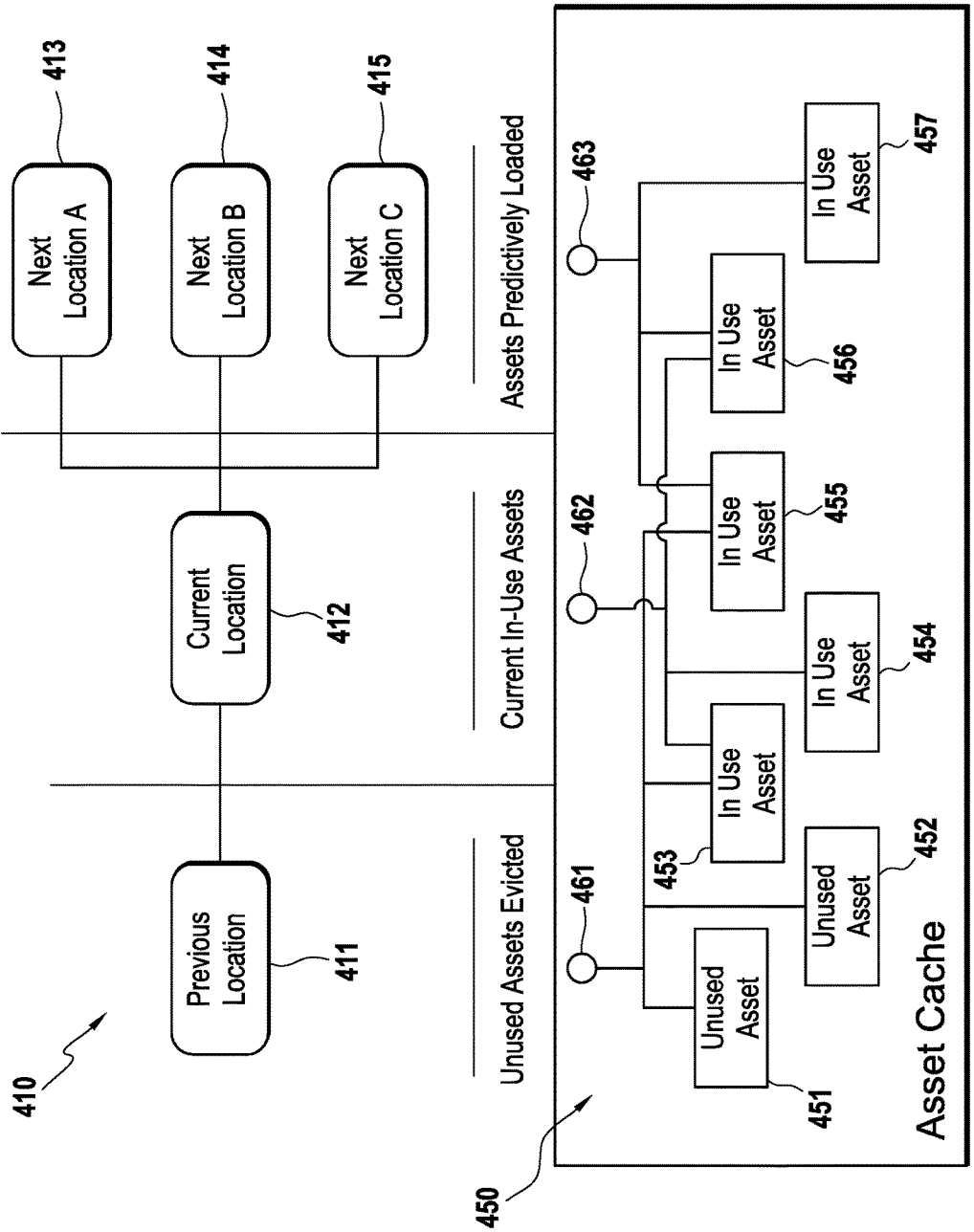
FIG. 4 illustrates a block diagram of a location graph and an asset cache to illustrate a transient asset loading mechanism, according to an embodiment.

Turning ahead in the drawings, FIG. 4 illustrates a block diagram of a location graph 410 and an asset cache 450 to illustrate a transient asset loading mechanism, according to an embodiment. The transient asset loading mechanism shown in FIG. 4 using location graph 410 and asset cache 450 is merely exemplary and embodiments of the transient asset loading mechanism are not limited to the embodiments presented herein. The transient asset loading mechanism can be employed in many different embodiments or examples not specifically depicted or described herein. Location graph 410 can be similar to location graph 300 (FIG. 3), and various elements of location graph 410 can be similar or identical to location graph 300 (FIG. 3).

As shown in FIG. 4, location graph can include location nodes 411-415, in which location node 411 represents a previously played location, location node 412 represents a currently playing location, and location nodes 413-415 represent possible subsequent locations. For simplicity, location graph 410 is shown with a limited number of location nodes. Location graph 410 can be used to play a content clip, such as content clip 200 (FIG. 2). Asset cache 450 can include source assets 451-457, which can each be a source asset (e.g., a 3D asset) that is used in playing the content clip. For simplicity, asset cache 450 is shown with a limited number of assets. Asset cache 450 can represent the local cache of source assets in player device 110 (FIG. 1), such as memory and/or storage of player device 110 (FIG. 1).

In a number of embodiments, if the content clip (e.g., 200 (FIG. 2)) defines source assets (e.g., 3D assets) as being used in multiple locations, cache management system 116 (FIG. 1) of player device 110 (FIG. 1) can limit duplicative downloading of the reused source assets across the predictive loading processes of the multiple locations and/or also can manage the contents of asset cache 450, such as to limit the size of asset cache 450. For example, if a 3D asset, such as a character or a chair, is used in playback of a current location and in a subsequent location, cache management system 116 can perform a transient asset loading mechanism in which it can manage the retention of the source assets in asset cache 450 and/or the downloading of source assets in the predictive loading process.

In many embodiments, cache management system 116 (FIG. 1) of player device 110 (FIG. 1) can manage the predictive loading of source assets and/or determine when source assets should be queued for streaming from server 130 (FIG. 1) in the predictive loading process. For example, at the current location represented by location node 412, location system 112 (FIG. 1) can determine that the possible subsequent locations are represented by location nodes 413-415. Cache management system 116 (FIG. 1) can determine the source assets that are used to render each of those subsequent locations, such that those source assets are queued for predictive loading. In several embodiments, cache management system 116 (FIG. 1) can determine check the contents of asset cache 450 to determine which source assets have already been downloaded and are still available in asset cache 450. As shown in FIG. 4, source assets 451-457 are currently available in asset cache 450. In various embodiments, those source assets that are still available (e.g., source assets 451-457) are not queued for streaming during the predictive loading process. Cache management system 116 (FIG. 1) can queue for downloading those source assets that are used for rendering the possible subsequent locations but that are determined to be not available in asset cache 450.

For example, handles 461-463 can show the source assets that are used for each step of location graph 410. The source assets that were used for rendering the previous location (represented by location node 411) are shown connected to handle 461, specifically, source assets 451, 452, 453, and 455. The source assets that are used for rendering the current location (represented by location node 412) are shown connected to handle 462, specifically, source assets 453, 454, and 456. The source assets that will possibly be used for rendering the possible subsequent locations (represented by location nodes 413-415) are shown connected to handle 463, specifically, source assets 455, 456, and 457. When playback of current location (represented by location node 412) begins, the source assets that were used for playback of the previous location (represented by location node 411) that are not being used for playback of the current location and that will not possibly by used for playback of the subsequent locations can be marked as "unused" and can be evicted. For example, source assets 451 and 452 were used for playback of the previous location, but are not used in playback of the current location and will not be used in the subsequent locations. As such, source assets 451 and 452 can be evicted.

In some embodiments, evicting the source assets can involve removing the source assets from asset cache 450. In other embodiments, such as shown in FIG. 4, evicting the source assets can mean marking those source assets as "unused" and available to be overwritten. In several embodiments, those source assets that are marked as "unused" can remain in asset cache 450 until they are overwritten by other source assets being streamed into asset cache 450, or cache management system 116 (FIG. 1) puts one or more of those source assets back in use for a later location, such as a location after the subsequent locations represented by location nodes 413-415. In some embodiments, the release or overwriting of unused source assets can be performed by cache management system 116 (FIG. 1) using a least recently used (LRU) algorithm or another suitable cache management algorithm.

If the current location (represented by location node 412) is using a source asset, or a subsequent location (represented by location nodes 413-415) will use a source asset, that source asset can be considered to be "in use," such that it will not be evicted until it is marked as unused. For example, source asset 453 was previously used for playback of the previous location and is currently used for playback of the current location, and is thus marked as "in use." Source asset 455 was previously used for playback of the previous location and will be used for playback of one or more of the possible subsequent locations, as is thus marked as "in use." Because source assets 453 and 455 were previously used and still in asset cache 450, they did not need to be queued for predictive loading of the current location and the possible subsequent locations, respectively.

Continuing with FIG. 4, source asset 456 was first used for playing the current location, so source asset 456 was queued for streaming during playback of the previous location during predictive loading of the source assets for the current location. Source asset 456 will also be used for the possible subsequent locations (represented by location nodes 413-415), so it will remain marked as "in use" after playback of current location ends unless the subsequent location chosen by the user from among the possible subsequent locations (represented by location nodes 413-415) does not use source asset 456, in which case it can be marked as "unused." Source asset 453 is no longer used after playback of current location 412, and can be marked as "unused." Source asset 457 will first be used for playing the possible subsequent locations, so source asset 457 is queued for streaming during playback of the current location during predictive loading of the source assets for the possible subsequent locations. If the subsequent location chosen by the user from among the possible subsequent locations (represented by location nodes 413-415) does not use source asset 457, it can be marked as "unused."

By evicting source assets that are no longer used, player device 110 (FIG. 1) can advantageously play the content clip (e.g., content clip 200 (FIG. 2)) using less memory and/or storage than used in a download model (which would include in the asset cache (e.g., 450) all the source assets needed to play the content clip). For example, the size of asset cache 450 can be as small as the collective size of the source assets that are "in use," which can be source assets that are used for playback at the current location and might be used for playback at the possible subsequent locations.

Figure 5:
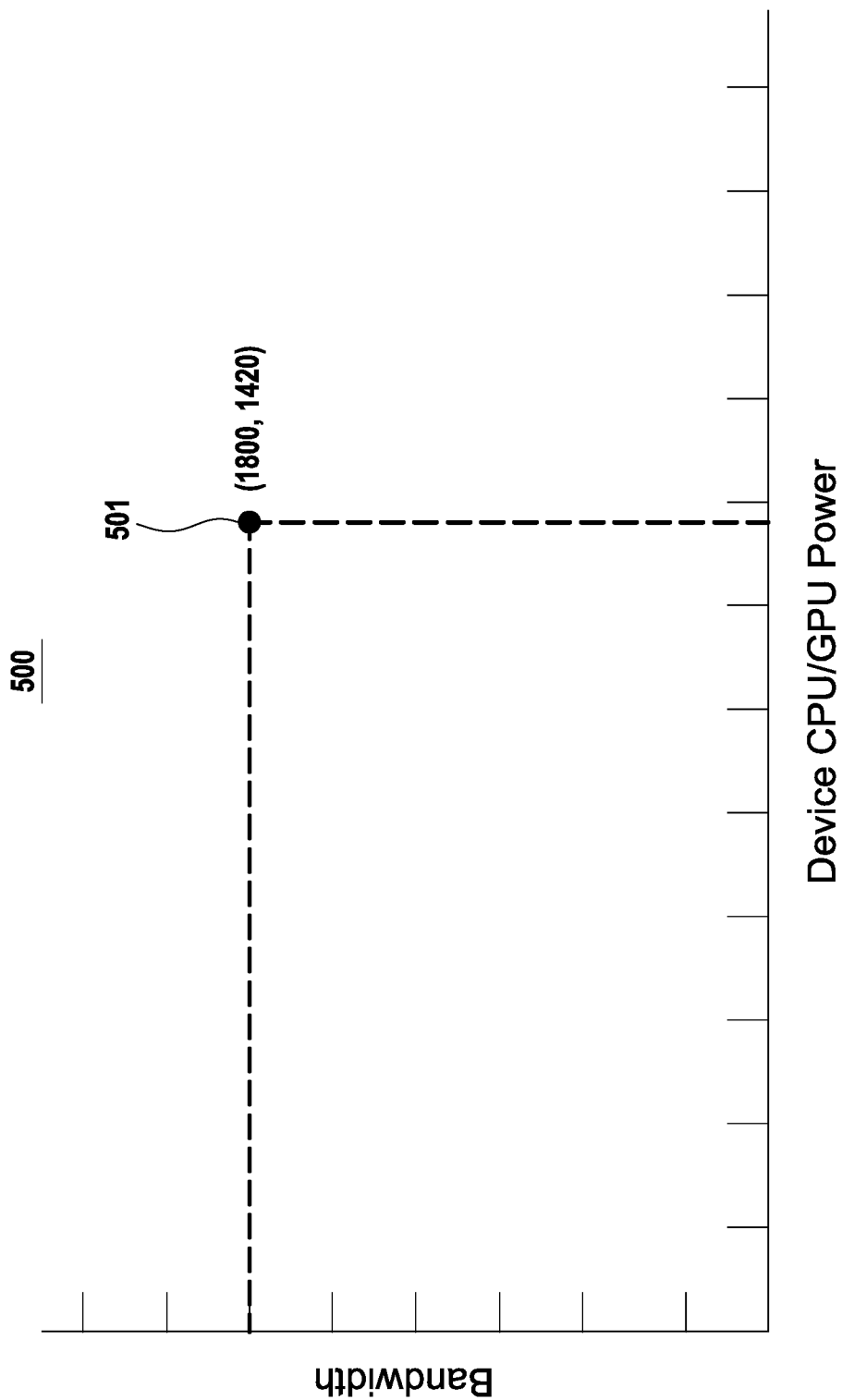
FIG. 5 illustrates a block diagram of an asset scoring graph, according to an embodiment.

Turning ahead in the drawings, FIG. 5 illustrates a block diagram of an asset scoring graph 500, according to an embodiment. Asset scoring graph 500 is merely exemplary of a bi-adaptive LOD technique and embodiments of the bi-adaptive LOD technique are not limited to the embodiments presented herein. The bi-adaptive LOD technique can be employed in many different embodiments or examples not specifically depicted or described herein. In many embodiments, the bi-adaptive LOD technique can be implemented in bandwidth management system 113 (FIG. 1), processing management system 114 (FIG. 1), and/or LOD management system 115 (FIG. 1) of player device 110 (FIG. 1). In many embodiments, player device 110 (FIG. 1) can implement a bi-adaptive LOD technique to adapt the LOD for source assets (e.g., 3D assets) streamed based at least in part on (a) a bandwidth for downloading through network 120 (FIG. 1) the source assets queued for predictive loading (also referred to as the "process of adapting for bandwidth"), and/or (b) a processing power of player device 110 (FIG. 1) for rendering the source assets (also referred to as the "the process of adapting for processing"), in order to achieve constant QOS during playback.

In many embodiments, the bi-adaptive LOD technique can use scoring to determine bandwidth requirements and processing requirements, such that LODs of source assets can be selected to maintain constant QOS during streaming playback. In several embodiments, player device 110 (FIG. 1) can determine a bandwidth score for downloading source assets through network 120 (FIG. 1), and/or can determine a processing score for rendering the source assets. For example, a player device (e.g., 110 (FIG. 1)) can determine that the bandwidth score is 1420 and the processing score is 1800, as represented by data point 501 in asset scoring graph 500. Each of these scores can represent a metric used in adjusting LODs of source assets that are predictively loaded in order to maintain constant QOS.

In several embodiments, each source asset can have scores (e.g., numeric values) assigned based on its memory footprint (i.e., the bandwidth score) and/or its CPU/GPU processing requirements (i.e., the processing score). The bandwidth score can represent the amount of bandwidth that will be required to stream the source asset through network 120 (FIG. 1). The processing score can represent the computational power (e.g., the CPU and GPU requirements) that is needed to render the source asset using player device 110 (FIG. 1). In many embodiments, these scores can be determined and assigned to the source assets during the authoring process, as described below in further detail.

In a number of embodiments, each source asset can have a set (e.g. a chain) of LODs. In many embodiments, the LODs can be generated (e.g., automatically generated) during the authoring process, which can allow a source asset to be displayed at a lower LOD with less detail or less fidelity. In several embodiments, each LOD in the chain of LODs for a source asset can be assigned a bandwidth score and a processing score. In various embodiments, each successive LOD in the chain of LODs can have a smaller bandwidth and/or processing score than the previous LOD in the chain.

Various algorithms can be used for scoring the source assets. In some embodiments, different algorithms can be used for scoring different types of source assets (e.g., textures, animations, sounds, 3D models, etc.). In some embodiments, bandwidth scores can be computing taking into account the memory footprint (e.g., file size) of the asset. For example, the bandwidth score can be the total size of the compressed file of the source asset in bytes divided by 1,000,000. The higher the bandwidth score of a source asset, the more data needs to be downloaded for the source asset.

In a number of embodiments, processing scores can be computed by analyzing how computationally intensive and asset will be to render. For example, the processing score can be based on an analysis of the number of polygons, texture size, complexity of shaders programs, complexity of animations, complexity of particle systems, etc. A processing score for a source asset can represent an approximation of the amount of computational power requested by the hardware to process and render the source asset. The higher the processing score of a source asset, the higher the CPU and/or GPU processing power will be requested to render the source asset upon playback. For example, the processing score for a source asset can be the estimated time (e.g., in milliseconds (ms)*100) to process the asset on a predefined nominal system (e.g., a Core i7 PC with a certain type of modern graphics card).

In many embodiments, each source asset can be assigned a priority value. For example, the priority value can be a numerical value from 0 to 1. The priority value can represent the general desired fidelity of the source asset, such that source assets with lower priority levels can be represented using lower-fidelity LODs, as described below in further detail. In several embodiments, the priority of each source asset can be set during the authoring process. In many embodiments, LOD management system 115 (FIG. 1) can attempt to use more detailed (e.g., higher-fidelity) LODs for source assets with higher priority values.

In various embodiments, an authoring system (e.g., authoring system 600 (FIG. 6), as described below) can be used to perform the authoring process. During the authoring process for a location, the authoring system (e.g., 600 (FIG. 6)) can determine a location bandwidth score for the location, which can represent the size of the source assets to be streamed for the location. In many embodiments, this location bandwidth score can be based on a sum of the bandwidth scores of each of the individual source assets used for playing the location. In many embodiments, the bandwidth scores of each of the individual source assets can initially be the bandwidth score of the LOD in the chain of LODs with the highest bandwidth score, which can be referred to as the "nominal asset bandwidth score" of the source asset. The location bandwidth score can be calculated as follow:

$$\text{location bandwidth score} = \sum_{n=1}^{N} \text{norminal asset bandwidth score } n$$

where asset bandwidth score n represents the nominal asset bandwidth score for a source asset n, and there are N source assets in the location.

In many embodiments, the author can define the target streaming time for each location using the authoring system (e.g., 600 (FIG. 6), described below)). In several embodiments, the target streaming time can represent the maximum allowed streaming time for player device 110 (FIG. 1) to stream the source assets of the location. The target streaming time can be used by bandwidth management system 113 (FIG. 1) of player device 110 (FIG. 1) to ensure that there is real-time instant streaming with no buffering delay in playback. The target streaming time can be set by the author dependent on the actual behavior of the interactive content in the location. The target streaming time can be the minimum amount of time it takes the user of player device 110 (FIG. 1) to proceed through the interactive content and move to the next location.

In a number of embodiments, a target bandwidth score can be computed (such as by the authoring system (e.g., 600 (FIG. 6), described below) and/or player device 110 (FIG. 1)). The target bandwidth score can be the total available bandwidth to stream the 3D assets within the target streaming time. The target bandwidth score can be calculated as follows:

target bandwidth score=bandwidth×target streaming time where the bandwidth can be a nominal bandwidth or a current bandwidth.

The nominal bandwidth can be the bandwidth that is expected for downloading to player device 110 (FIG. 1) using network 120 (FIG. 1). In some embodiments, the nominal bandwidth can be preset by the author, as described below. When the nominal bandwidth is used for the bandwidth, such as during authoring, the target bandwidth score can be the nominal target bandwidth score, which is computed as follows:

nominal target bandwidth score=nominal bandwidth× target streaming time

In many embodiments, the nominal target bandwidth score can be used during the authoring process, as described below.

The current bandwidth can be used as the bandwidth during content playback. In several embodiments, during content playback, bandwidth management system 113 (FIG. 1) of player device 110 (FIG. 1) can determine a current bandwidth for downloading source assets through network 120 (FIG. 1). The current bandwidth can be dynamically computed based on the current actual bandwidth, which can vary based on network conditions. As an example, the current bandwidth can be computed as a running average of download rates when downloading at full tilt. As another example, the current bandwidth can be calculated on a periodic basis, such as every 10 seconds, 30 second, 1 minute, or another suitable time period. When the current bandwidth is used, such as during playback, the target bandwidth score can be the current target bandwidth score, which can be computed as follows:

current target bandwidth score=current bandwidth× target streaming time

In many embodiments, when the target bandwidth score is used during authoring, the nominal target bandwidth score can be used as the target bandwidth score, and when the target bandwidth score is used during playback, the current target bandwidth score can be used as the target bandwidth score. In other embodiments, the nominal target bandwidth score can be used both during authoring and playback.

In some embodiments, bandwidth management system 113 (FIG. 1) of player device 110 (FIG. 1) can calculate an adjusted location bandwidth score. For example, the adjusted location bandwidth score can be calculated as follows:

$$\text{adjusted location bandwidth score} = \sum_{n=1}^{N} \text{asset bandwidth score } n \ (LOD)$$

where the asset bandwidth score n (LOD) represents the bandwidth score for a source asset n at an adjusted LOD, and there are N source assets in the location. In many embodiments, the adjusted location bandwidth score can be similar to the location bandwidth score, but can be based on the LOD asset bandwidth scores of the source assets adjusted for LOD. When the LOD is set the maximum value (nominal), the adjusted location bandwidth score is the same value as the location bandwidth score. After a lower LOD is used for one or more source assets, the adjusted location bandwidth score is less than the location bandwidth score.

In a number of embodiments, once the adjusted location bandwidth score is computed, bandwidth management system 113 (FIG. 1) of player device 110 (FIG. 1) can compare the target bandwidth score to the adjusted location bandwidth score to determine if the size of the source assets for the location is within the size of the data that can be streamed under the bandwidth conditions (e.g., the nominal bandwidth or the current bandwidth). If the adjusted location bandwidth score is less than or equal to the target bandwidth score, the actual streaming time of the source assets for the location can be within the target streaming time. If the adjusted location bandwidth score is higher than the target bandwidth score, LOD management system 115 (FIG. 1) of player device 110 (FIG. 1) can select alternate LODs for one or more source assets with lower bandwidth scores until the adjusted location bandwidth score is less than or equal to the target bandwidth score.

In many embodiments, these alternative LODs can be selected by LOD management system 115 (FIG. 1) based on the priority values of the source assets. For example, in some embodiments, the process of adapting the content to stream within the bandwidth (e.g., nominal bandwidth or current bandwidth) can proceed as follows:
1. If the adjusted location bandwidth score is less than or equal to the target bandwidth score, the process of adapting for bandwidth is complete and the list of source assets and LODs is submitted to the next process of adapting for processing.
2. If the adjusted location bandwidth score is greater than the target bandwidth score, LOD management system 115 (FIG. 1) of player device (110 (FIG. 1) can find the first source asset with the lower priority that has not yet had its LOD adjusted to the next lowest LOD level (referred to as the "current target LOD"), and lower it to the current target LOD. If no source assets are left that have not yet had their LOD's reduced to the current target LOD, the current target LOD is reduced to the next lower LOD level.
3. The adjusted location bandwidth score is recomputed with the LOD adjustments, and the process cycles back to step 1.

In various embodiments, after performing the process for adapting for bandwidth by adapting the LODs of the source assets to be streamed, the source assets can streamed at adapted LOD levels. In many embodiments, the process for adapting LODs for bandwidth can beneficially guarantee that the source assets will be downloaded within the amount of time specified by the target streaming time, such that there will be no pauses or gaps in playback for buffering.

In many embodiments, upon beginning playback of a current location, the predictive loading for the possible next locations can involve the process of adapting for bandwidth, as described above, with a few variations. For example, the target streaming time of the current location can be used as the target streaming time for streaming the source assets needed to play the possible next locations. In many embodiments, the location bandwidth score can be a total location bandwidth score for each of the next possible locations (e.g., child locations). In several embodiments, the adjusted location bandwidth score can be a total adjusted location bandwidth score for each of the next possible locations (e.g., child locations). In many embodiments, this total location bandwidth score and/or total adjusted location bandwidth score can be calculated based on the distinct union of the source assets for all of the next possible locations (e.g., child locations), such that the calculation does not "double count" for source assets that are in more than one of the next possible locations. In several embodiments, the total location bandwidth score and/or total adjusted location bandwidth score can be calculated by not including source assets that are already in the asset cache (e.g., 450 (FIG. 4)), as those assets are available in player device 110 (FIG. 1) and do not need to be downloaded.

In several embodiments, after the process of adapting for bandwidth, player device can perform the process of adapting for processing. In other embodiments, the process of adapting for processing can occur before or concurrently with the process of adapting for bandwidth. In various embodiments, the authoring system (e.g., 600 (FIG. 6), as described below) can determine a location processing score for a location, which can represent the time required to render the source assets for each rendered frame of the location. In many embodiments, this location processing score can be based on a sum of the processing scores of each of the individual source assets used for playing the location, which can be calculated as described above. In many embodiments, the processing scores of each of the individual source assets can initially be the processing score of the LOD in the chain of LODs with the highest processing score, which can be referred to as the "nominal asset processing score" of the source asset. The location processing score can be calculated as follow:

$$\text{location processing score} = \sum_{n=1}^{N} \text{nominal asset processing score } n$$

where nominal asset processing score n represents the nominal asset processing score for a source asset n, and there are N source assets in the location.

In a number of embodiments, a nominal target processing score can be calculated (such as by the authoring system (e.g., 600 (FIG. 6), described below) and/or player device 110 (FIG. 1)) based on a target framerate of the player device (e.g., 110 (FIG. 1)). Under current conventions, the target framerate for a VR headset can be 75 Hertz (Hz), and the target framerate of other types of player devices can be 60 Hz, but these values can change based on different types of player devices having different framerates. Specifically, the nominal target processing score can be calculated as follows:

$$\text{nominal target processing score} = \frac{1000 \text{ ms}}{\text{target framerate}} \times 100$$

In many embodiments, each possible type of player device (e.g., an iPhone, an iPad, a high-end PC, a video game system, etc.) can be assigned a target ratio, which can be a constant representing the processing capabilities of the player device. This target ratio can be calculated as follows:

$$\text{target ratio} = \frac{\text{nominal processing resources}}{\text{device processing resources}}$$

As shown, the target ratio can be a ratio of the processing power of a predefined nominal player device (e.g., a Core i7 PC with a certain type of modern graphics card, such as described above for calculating the processing scores for each source asset) (i.e., the nominal processing resources) with respect to the processing power of the player device to be used (e.g., player device 110 (FIG. 1)) (i.e., the device processing resources).

In other embodiments, the target ratio can be dynamically calculated by processing management system 113 (FIG. 1) at runtime on player device 110 (FIG. 1) by dynamically calculating the target ratio at runtime based on the nominal processing resources of the predefined nominal system (i.e., the nominal processing resources) compared with current processing resources of the player device (e.g., 110 (FIG. 1)) to be used (i.e., the device processing resources). For example, the current processing resources can be calculated by measuring actual currently available processing resources on player device 110 (FIG. 1), which can vary based on the other processes on player device 110 (FIG. 1) that are requesting processing resources. As an example, the current processing resources can be computed as a running average of available processing resources. As another example, the current processing resources can be calculated on a periodic basis, such as every 1 second, 5 seconds, 10 seconds, 30 second, 1 minute, or another suitable time period.

In a number of embodiments, once the target ratio is computed, processing management system 113 (FIG. 1) of player device 110 (FIG. 1) can determine an adjusted location processing score. The adjusted location processing score can be calculated as follows:

$$\text{adjusted location processing score} = \sum_{n=1}^{N} \text{asset processing score } n \, (LOD) \times \text{target ratio}$$

where asset processing score n (LOD) represents the processing score for a source asset n at an adjusted LOD, and there are N source assets in the location. In many embodiments, the adjusted location processing score can be similar to the location processing score, but can be based on the asset processing scores of the source assets adjusted for LOD and the target ratio. When the LOD is set the maximum value (nominal), the adjusted location processing score is the same value as the location processing score multiplied by the target ratio. After a lower LOD is used for one or more source assets, the adjusted location processing score is less than the location processing score multiplied by the target ratio.

In many embodiments, processing management system 113 (FIG. 1) of player device 110 (FIG. 1) can compare the adjusted location processing score to the nominal target processing score to determine if the source assets can be rendered for the location within the time allowed by the target framerate. If the adjusted location processing score is less than or equal to the nominal target processing score, the actual rendering time of the source assets for the location can be with the time allowed by the target framerate. If the adjusted location processing score is higher than the nominal target processing score, LOD management system 115 (FIG. 1) of player device 110 (FIG. 1) can select alternate LODs for one or more source assets with lower processing scores until the adjusted location processing score is less than or equal to the nominal target processing score.

In many embodiments, these alternative LODs can be selected by LOD management system 115 (FIG. 1) based on the priority values of the source assets. For example, in some embodiments, the process of adapting the content to render within the time afforded by the current framerate can proceed as follows:

1. If the adjusted location processing score is less than or equal to the nominal target processing score, the process of adapting for processing is complete and the list of source assets and LODs is queued for downloading.
2. If the adjusted location processing score is greater than the nominal target processing score, LOD management system 115 (FIG. 1) of player device (110 (FIG. 1) can find the first source asset with the lower priority that has not yet had its LOD adjusted to the next lowest LOD level (referred to as the "current target LOD"), and lower it to the current target LOD. If no source assets are left that have not yet had their LOD's reduced to the current target LOD, the current target LOD is reduced to the next lower LOD level.
3. The adjusted location processing score processing score is recomputed with the LOD adjustments, and the process cycles back to step 1.

In various embodiments, after performing the process for adapting for processing by adapting the LODs of the source assets to be rendered, the source assets can be queued to be streamed at the adapted LOD levels. In many embodiments, the process for adapting LODs for processing can beneficially guarantee that the source assets will be rendered within the amount of time allowed by the framerate on the type of player device (e.g., 110 (FIG. 1)) being used, such that there will be real-time rendering with no pauses or gaps in playback for rendering.

In many embodiments, upon beginning playback of a current location, the predictive loading for the possible next locations can involve the process of adapting for processing, as described above. For example, the adjusted location processing score for each of the possible next locations (e.g., child locations) can be considered individually to ensure that each of the next possible locations, if chosen by the user of player device 110 (FIG. 1), can be rendered with real-time rendering.

In some embodiments, the processes of adapting for bandwidth and/or processing can be performed before predictive loading of source assets for the next possible locations. In various embodiments, the processes of adapting for bandwidth and/or processing also can be performed while streaming the source assets to account for variations in bandwidth during the streaming.

In several embodiments, the bi-adaptive processes of adapting for bandwidth and processing using dynamic LODs can advantageously provide smooth, instant streaming and performance consistency of real-time, cross-platform interactive 3D simulations. For example, by adapting the processing for different types of player devices (e.g., 110 (FIG. 1)), those different types of devices can render the content in real-time within the time afforded by the frame rate. For player device having lower processing capabilities, the LODs of the source assets can be decreased in order to maintain real-time rendering. Similarly, for networks (e.g., 120 (FIG. 1)) having less bandwidth, the LODs of the source assets can be decreased in order to maintain real-time instant streaming. Together the bi-adaptive processes can provide constant QOS for the interactive CG content, despite variations in bandwidth and/or processing capabilities.

Figure 6:
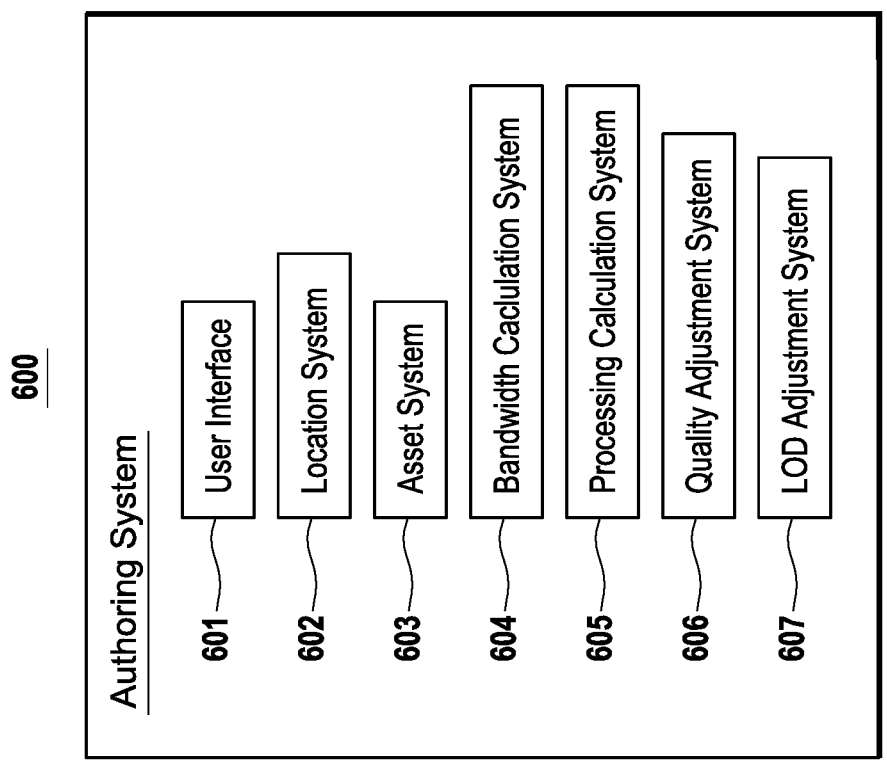
FIG. 6 illustrates a block diagram of an authoring system that can be employed for authoring of real-time interactive CG content for predictive bi-adaptive streaming, according to an embodiment.

Turning to the drawings, FIG. 6 illustrates a block diagram of an authoring system 600 that can be employed for authoring of real-time interactive CG content for predictive bi-adaptive streaming, according to an embodiment. Authoring system 600 is merely exemplary and embodiments of the authoring system are not limited to the embodiments presented herein. The authoring system can be employed in many different embodiments or examples not specifically depicted or described herein. In some embodiments, certain elements or modules of authoring system 600 can perform various procedures, processes, and/or activities. In other embodiments, the procedures, processes, and/or activities can be performed by other suitable elements or modules of authoring system 600.

In a number of embodiments, authoring system 600 can include one or more systems, such as user interface 601, a location system 602, an asset system 603, a bandwidth calculation system 604, a processing calculation system 605, a quality adjustment system 606, and/or an LOD adjustment system 607, as described below in further detail. In many embodiments, the systems (e.g., 601-607) of authoring system 600 can be software and/or hardware modules that implement the functions described herein. User of authoring system 600 can use authoring system 600 to create content, such as content clip 200 (FIG. 2). Such users are referred to herein as "authors."

In many embodiments, user interface 601 can provide a visual interface for a 3D game engine, which can be a software framework for creating and/or developing interactive CG content, such as video games, for example. The game engine can be used to create content (e.g., video games) for game consoles, mobile device, personal computers, and/or other suitable type of player devices (e.g., 110 (FIG. 1)). In many embodiments, the game engine can include a rendering engine for rendering the CG graphics, a physics engine for collision detection and/or collection response, a sound engine, scripting systems, animation systems, artificial intelligence systems, etc., such as using convention techniques. In some embodiments, the 3D game engine can allow reusing and/or adapting content for various different types of platforms of player devices (e.g., 110 (FIG. 1)).

As part of, or in addition to the 3D game engine, in many embodiments, authoring system can include in user interface 601 feedback on how the authored content will perform on a player device (e.g., 110 (FIG. 1)). For example, user interface 601 can display the bandwidth and/or processing requirements for the content, such as by location, for example. In several embodiments, user interface 601 can display the LOD adaptations required in order to maintain constant QOS. In a number of embodiments, authoring system 600 can use an asset scoring technique similar or identical to the asset scoring techniques discussed above. In various embodiments, user interface 601 can provide immediate and/or prompt visual feedback to advantageously allow authors to easily and efficiently craft their content while being aware of bandwidth and/or processing restraints and/or effects on fidelity. In some embodiments, for example, the visual feedback can be in the form of percentage gauges or another suitable visual display method. In many embodiments, user interface 601 can cause visual display information to be displayed, such as on screen 1808 as shown in FIG. 18 and described below, or another suitable display. In many embodiments, user interface can receive input from the authors through a user input, such as keyboard 1804 and/or mouse 1810, as shown in FIG. 18 and described below, or another suitable user input device.

In several embodiments, in order to provide constant QOS for streamed interactive CG content, the content can be authored in a way such that it can be streamed within the available bandwidth. Returning to FIG. 6, in many embodiments, location system 602 can be used by an author to when create content. For example, location system 602 can be used to create locations, create location graphs, and/or add source assets (e.g., 3D assets) to locations based on the author's desired design for the content. For example, the source asset can be added to the location via drag and drop or another suitable content editing technique.

In many embodiments, asset system 603 can be used to define assets and/or can create various LODs for the source assets, such as a chain of LODs. In some embodiments, the LOD chain can be created automatically, manually, or a combination thereof, such as by using conventional LOD techniques. In many embodiments, the author can determine the nominal (e.g., default) LOD for a source asset. In several embodiments, the nominal LOD can for a source asset can be the highest LOD (e.g., highest fidelity LOD) of the source asset. In a number of embodiments, asset system 603 can be used to set the priority value of source assets, as described above.

In various embodiments, bandwidth calculation system 604 can calculate bandwidth scores and/or processing calculation system 605 can calculate processing scores, such as described above. For example, bandwidth calculation system 604 can pre-compute a bandwidth score can precompute a processing score for each LOD of each source asset (e.g., 3D asset). For example, processing calculation system 605 can precompute a processing score for each LOD of each source asset (e.g., 3D asset). In several embodiments, bandwidth calculation system 604 can determine a location bandwidth score and/or adjusted location bandwidth score for streaming a location, based on the assets included in the location, and/or processing calculation system 605 can determine the location processing score and/or adjusted location processing score for rending the location. Adding assets to the location can increase the location bandwidth score, adjusted location bandwidth score, location processing score and/or adjusted location processing score, and removing assets from the location can decrease the location bandwidth score, adjusted location bandwidth score, location processing score and/or adjusted location processing score. As described below in further detail, in many embodiments, quality adjustment system 606 (FIG. 6) can be used to adjust the LODs for the source assets in order to view the source assets at the quality level selected and LOD adjustment system 607 (FIG. 6) can adjust the LODs for source assets in order to view the source assets at the LOD level selected.

Figure 7:
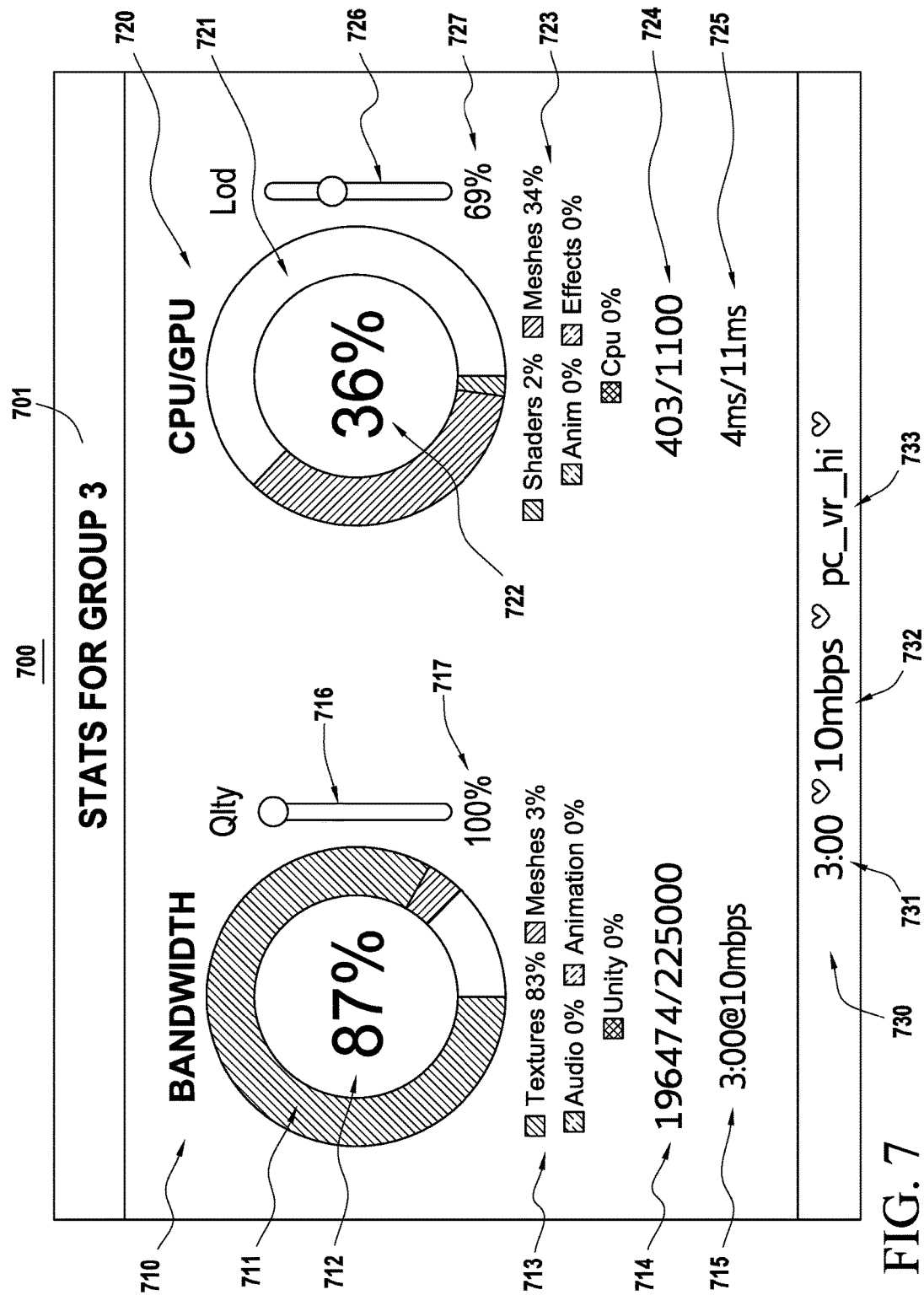
FIG. 7 illustrates a user interface display of a usage gauge panel, according to an embodiment.

Turning to the drawings, FIG. 7 illustrates a user interface display of a usage gauge panel 700, according to an embodiment. Usage gauge panel 700 is merely exemplary and embodiments of the usage gauge panel are not limited to the embodiments presented herein. The usage gauge panel can be employed in many different embodiments or examples not specifically depicted or described herein. In some embodiments, certain elements of usage gauge panel 700 can display various pieces of information and/or perform various procedures, processes, and/or activities. In other embodiments, the pieces of information can be displayed, and/or the procedures, processes, and/or activities can be performed, by other suitable elements of usage gauge panel 700. In many embodiments, usage gauge panel 700 can be used while authoring content to display bandwidth usage and/or processing usage, such that the author can tailor the content in such a way that the LODs of source assets used during playback are at an acceptable level of fidelity to the author. In several embodiments, usage gauge panel 700 can display metrics for a particular location, such as a location in a location graph (e.g., 300 (FIG. 3)). In many embodiments, user interface 601 (FIG. 6) can display usage gauge panel 700.

In many embodiments, usage gauge panel 700 can include a title bar 701, a bandwidth panel 710, a processing panel 730, and a settings bar 730. In a number of embodiments, title bar 701 can display the location for which usage gauge panel is display the metrics. For example, title bar 701 can display STATS FOR "GROUP3," such that the metrics for the location labeled GROUP3 are displayed in usage gauge panel. In many embodiments, the metrics in bandwidth panel 710 can be calculated by bandwidth calculation system 604 (FIG. 6), and/or the metrics in processing panel 720 can be calculated by processing calculation system 605 (FIG. 6).

In a number of embodiments, settings bar 730 can include a target streaming time selector 731, a nominal bandwidth selector 732, and/or a target device selector 733. In many embodiments, target streaming time selector 731 can be used by author to select and/or display the selection of the target streaming time for the location, as described above. For example, the target streaming time for the location can be set to 3:00, meaning 3 minutes and 0 seconds, as shown in FIG. 7. In several embodiments, nominal bandwidth selector 732 can be used to select and/or display the selection of the nominal bandwidth. For example, the nominal bandwidth can be set to 10 mbps (megabits per second), as shown in FIG. 7. In some embodiments, target device selector 733 can be used to select a target device type for the player device (e.g., 110 (FIG. 1)). In many embodiments, the target device type can be used to determine the nominal target processing score, as described above. In various embodiments, each type of device can have a nominal target processing score based on known or expected real-world performance of the target device type. For example, the target device type can be set to "pc_vr_hi," as shown in FIG. 7, which can represent a certain target device type.

In various several embodiments, bandwidth panel 710 can include a bandwidth resource label 715, which can display the target streaming time, as set in target streaming time selector 731, and the nominal bandwidth, as set in nominal bandwidth selector 732. For example, bandwidth resource label 715 can display that the estimated time and bandwidth to stream the source assets for the location as "3:00@10 mbps," as shown in FIG. 7.

In several embodiments, bandwidth panel 710 can include a bandwidth numeric comparison label 714, which can display as a fraction the location bandwidth score (or adjusted location bandwidth score) with respect to the nominal target bandwidth score. For example, as shown in FIG. 7, the location bandwidth score (or adjusted location bandwidth score) can be 196474 and the nominal target bandwidth score can be 225000, such that bandwidth numeric comparison label 714 can display as "196474/225000," as shown in FIG. 7. In many embodiments, the nominal target bandwidth score can be calculated based on the nominal bandwidth set in nominal bandwidth selector 732, and/or the adjusted location bandwidth score can be calculated as described above, based on the bandwidth scores of the LODs of the source assets (which can initially by the nominal asset bandwidth scores for the highest LOD).

In many embodiments, bandwidth panel 710 can include a bandwidth usage circle graph 711 and/or a bandwidth usage label 712, which can display bandwidth usage for the location graphically and/or as a percentage, respectively. For example, the bandwidth usage can be the location bandwidth score (or adjusted location bandwidth score) as a percentage of the nominal target bandwidth score. In many embodiments, the bandwidth usage can be based on the current source assets added to the location. For example, the bandwidth usage for the source assets in the GROUP3 location can be 87%, as shown in FIG. 7. In several embodiments, bandwidth panel 710 can include a bandwidth usage legend 713, which can indicate the bandwidth usage of components that are included in the bandwidth usage for the overall location. For example, the 87% bandwidth usage can be broken down by components of source assets, such as 83% for textures, 3% for meshes, 0% for audio, 0% for animations, and 0% for unity (e.g., other), as shown in FIG. 7.

In several embodiments, bandwidth panel 710 can include a quality selector 716, which can be used to select a quality level, and a quality label, 717, which can display the quality level selected. For example, quality selector 716 can be a slider, such as shown in FIG. 7, or another suitable type of selector. By adjusting the quality level, the author cause quality adjustment system 606 (FIG. 6) to adjust the LODs for the source assets in order to view the source assets at the quality level selected. In many embodiments, quality adjustment system 606 (FIG. 6) can adjust the LOD of source assets until the adjusted location bandwidth score is less than or equal to the nominal target bandwidth score. The LOD adjustment of source assets can be similar or identical to the LOD adjustment performed by LOD management system 115. The location bandwidth score can be adjusted based on the LODs of the source assets. The LODs, as adjusted, can be used for determining the adjusted location bandwidth score, which is used in bandwidth numeric comparison label 714, and is used to calculate the bandwidth usage displayed in bandwidth usage circle graph 711 and bandwidth usage label 712.

In some embodiments, authoring system can display in user interface 601 (FIG. 6) a scene view, which can display a 3D representation of the current location as it would be seen by the user of player device 110 (FIG. 1) when the LODs of the source assets in the location are adjusted for the quality level set in quality level selector 716. By using adjusting quality level selector 716, the author can preview the quality and/or fidelity the user will see upon playback in player device 110 (FIG. 1) at the quality level selected. By viewing LODs with lower fidelity, the author can determine acceptable quality levels and/or remove and/or edit source assets in the location to improve visual fidelity.

In various several embodiments, processing panel 720 can include a processing resource label 725, which can display the estimated time to render a frame with respect to the nominal frame rendering time. In many embodiments, the nominal frame rendering time can be based on the target device type set in target device selector 733. For example, processing resource label 725 can display that the estimated frame rendering time is 4 ms and the nominal frame rendering time is 11 ms, such that processing resource label 725 can display as "4 ms/11 ms," as shown in FIG. 7.

In several embodiments, processing panel 720 can include a processing numeric comparison label 724, which can display as a fraction the adjusted location processing score with respect to the nominal target processing score. For example, as shown in FIG. 7, the adjusted location processing score can be 403 and the nominal target processing score can be 1100, such that processing numeric comparison label 724 can display as "403/1100," as shown in FIG. 7.

In many embodiments, processing panel 720 can include a processing usage circle graph 721 and/or a processing usage label 722, which can display processing usage for the location graphically and/or as a percentage, respectively. For example, the processing usage can be the adjusted location processing score as a percentage of the nominal target processing score. In many embodiments, the processing usage can be based on the current source assets added to the location. For example, the processing usage for the source assets in the GROUP3 location can be 36%, as shown in FIG. 7. In several embodiments, processing panel 720 can include a processing usage legend 723, which can indicate the processing usage of components that are included in the processing usage for the overall location. For example, the 36% processing usage can be broken down by components of source assets, such as 2% for shaders, 34% for meshes, 0% for animations, 0% for effects, and 0% for CPU (e.g., other), as shown in FIG. 7.

In several embodiments, processing panel 720 can include an LOD level selector 726, which can be used to select a LOD level, and a LOD label, 727, which can display the LOD level selected. For example, LOD level selector 726 can be a slider, such as shown in FIG. 7, or another suitable type of selector. By adjusting the LOD level, the author cause LOD adjustment system 606 (FIG. 6) to adjust the LODs for the source assets in order to view the source assets at the LOD level selected. In many embodiments, LOD adjustment system 607 (FIG. 6) can adjust the LODs for source assets, consequently affecting the adjusted location processing score, until the adjusted location processing score is less than or equal to the nominal target processing score. The LOD adjustment of source assets can be similar or identical to the LOD adjustment performed by LOD management system 115. The adjusted location processing score can be adjusted based on the LODs of the source assets. The LODs, as adjusted, can be used for determining the adjusted location processing score, which is used in processing numeric comparison label 724, and is used to calculate the processing usage displayed in processing usage circle graph 721 and processing usage label 722.

In some embodiments, the scene view in user interface 601 (FIG. 6) can display a 3D representation of the current location as it would be seen by the user of player device 110 (FIG. 1) when the LODs of the source assets in the location are adjusted for the LOD level set in LOD level selector 726. By using adjusting LOD level selector 726, the author can preview the quality and/or fidelity the user will see upon playback in player device 110 (FIG. 1) at the LOD level selected. In many embodiments, the LOD level and the quality level each can be adjusted to certain values, and the scene view can represent (e.g., preview) the LODs of the source assets based on the combined constraints. Each of these restraints can adjust the LODs differently. For example, LOD adjustments for shaders can have small or non-existent effect on the bandwidth score, but can dramatically affect the processing score. By viewing LODs with lower fidelity, the author can determine acceptable LOD levels and/or remove and/or edit source assets in the location to improve visual fidelity.

In many embodiments, adjusting quality level selector 716 and/or LOD level selector 726 can adjust the LODs used in calculating the metrics displayed in usage gauge panel 700, and in displayed the source assets in the scene view. In many embodiments, these adjustment of quality level selector 716 and/or LOD level selector 726 can advantageously provide these metrics and display information to allow the author to adjust the content (e.g., source assets in the location) to desirable settings, and these adjustments do not set the LODs for the source assets that will be streamed during predictive loading, as the LODs can be adjusted for predictive loading during playback in the manner described above.

In several embodiments, the more assets that are added to the location, the higher the bandwidth usage and/or processing usage. These utilization amounts can be graphically displayed in usage gauge panel 700 as percentages in bandwidth usage label 712 and processing usage label 722. If the bandwidth usage and the processing usage each stay in the range of 0% to 100%, the location can stream with constant QOS, without delays or pauses for buffering and rendering under the current settings (e.g., the current source assets in the location, the settings provided in settings bar 730, quality level selector 716, and/or LOD level selector 726). If the processing usage or the bandwidth usage exceeds 100%, the LODs for source assets will need to be adjusted during streaming in order maintain constant QOS. The author can view the desirability of these adjustments by adjusting quality level selector 716 and/or LOD level selector 726 and viewing the 3D representation in the scene view. In some embodiments, quality level selector 716 and/or LOD level selector 726 can have minimum settings that are still acceptable. If the processing usage and bandwidth usage cannot be brought below 100% with the quality level selector 716 and LOD level selector 726 above the minimum settings, usage gauge 700 and/or the scene view can indicate to the author that the content will not be able to play at acceptable levels (acceptable fidelity) and maintain constant QOS under the current settings, such that the author can make adjustments to the content and/or desired settings.

In a number of embodiments, usage gauge panel 700 and/or scene view in user interface 601 (FIG. 6) can provide immediate visual feedback, which can beneficially allow authors to fine tune the content they create and ensure that the content can playback with constant QOS with adequate quality and/or fidelity. In several embodiments, these observations and determinations can be made without needing to publish and run the content on an actual player device (e.g., 110 (FIG. 1)). In many embodiments, these observations and determinations can be made for various target devices and various bandwidths. For example, authors can manually select the nominal bandwidth in nominal bandwidth selector 732 and/or the target device type in target device selector 733 and observe the effects on bandwidth usage and/or processing usage as shown in usage gauge panel 700. For example, if the content remains the same and the nominal bandwidth is increased from 4 mbps to 8 mbps, a bandwidth usage at 100% will decrease to 50%. These types of observations can allow authors to visualize how their content will behave as it streams across a variety of bandwidths and/or target device types.

In several embodiments, when usage gauge panel 700 is used with a single location, the metrics will reflect only the source assets in the current location. For example, usage gauge panel 700 can display metrics under the assumption that the source assets are not already in the asset cache (e.g., 450 (FIG. 4)). For determining processing scores, usage gauge panel 700 can display metrics under the assumption that the only visible objects (e.g. objects that need rendering) for playback of the location are included the group of source assets for the current location. These metrics when working in a single location can be provided in usage gauge panel 700 as a guide to the author.

When the location is placed in a location graph (e.g., 300 (FIG. 3)), the metrics can be different than the metrics for a single location. For example, the location bandwidth score (or adjusted location bandwidth score) can be lower, as source assets can be already available in the asset cache (e.g., 450 (FIG. 4)). The adjusted location processing score can be higher, as rendering the location can, in some examples, require rendering additional source assets for objects that can be visible. In other embodiments, the source assets to be rendered for a location can be limited to those source assets defined for that location.

Figure 8:
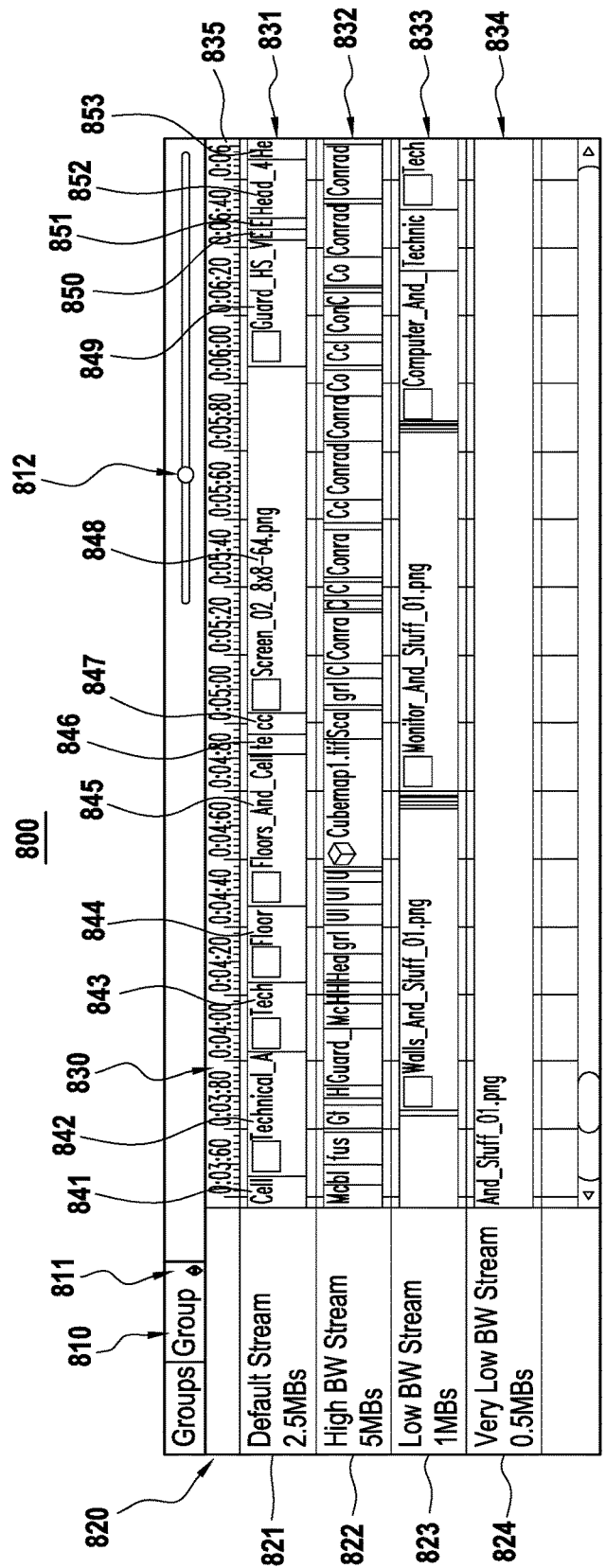
FIG. 8 illustrates a user interface display of a breakout score view, according to an embodiment.

Turning to the drawings, FIG. 8 illustrates a user interface display of a breakout score view 800, according to an embodiment. Breakout score view 800 is merely exemplary and embodiments of the breakout score view are not limited to the embodiments presented herein. The breakout score view can be employed in many different embodiments or examples not specifically depicted or described herein. In some embodiments, certain elements of breakout score view 800 can display various pieces of information and/or perform various procedures, processes, and/or activities. In other embodiments, the pieces of information can be displayed, and/or the procedures, processes, and/or activities can be performed, by other suitable elements of breakout score view 800. In many embodiments, breakout score view 800 can be used while authoring content to display bandwidth usage and/or processing usage with greater granularity, such as by individual source assets or groups of source assets of the same or similar type, and/or by LODs, which can allow the author to discover how each source asset in a particular location contributes to the location bandwidth score, adjusted location bandwidth, and/or adjusted location processing score and make adjustments, if necessary. In many embodiments, user interface 601 (FIG. 6) can display breakout score view 800.

In many embodiments, breakout score view 800 can include a location selector 810, which can allow the author to select the location, such as the location in a location graph (e.g., 300 (FIG. 3)). In several embodiments, breakout score view 800 can include a view selector 811, which can allow the author to select the view type, such as a bandwidth view, as shown in FIG. 8, or a processing view. In a number of embodiments, breakout score view 800 can include a scale slider 812, which can control the horizontal scale of second column 830, described below.

In several embodiments, breakout score view 800 can include a first column 820, which can include row headers (e.g., 821-824). In the bandwidth view, the row headers (e.g., 821-824) can list different nominal bandwidth levels, such as nominal bandwidths that can be selected using nominal bandwidth selector 732 (FIG. 7). For example, the different nominal bandwidth level can be a default bandwidth stream of 2.5 mbps (as shown in row header 821), a high bandwidth stream of 5.0 mbps (as shown in row header 822), a low bandwidth stream of 1.0 mbps (as shown in row header 823), and a very low bandwidth stream of 0.5 mbps (as shown in row header 824). In the processing view, the row headers (e.g., 821-824) can list different target device types, such as target device types that can be selected using target device selector 733 (FIG. 7).

In a number of embodiments, breakout score view 800 can include a second column 830, which can be a timeline an can include rows (e.g., 831-834) corresponding to the row headers (e.g., 821-824). In various embodiments, second column 830 can be headed by a timeline 835, which can be a bandwidth timeline (for the bandwidth view) or a processing timeline (for the processing view). In many embodiments, the rows (e.g., 831-834) can include various asset cells, such as asset cells 841-853 in row 831, which can each correspond to a source asset or, in some embodiments, a group of source assets for the location selected in location selector 810. In the bandwidth view, each row (e.g., 831-834) can show the estimated load (streaming) order of the source assets represented by the asset cells (e.g., 841-853), and/or the time needed to load (download) each asset at the nominal bandwidth in the corresponding row header (e.g., 821-824). In the processing view, each row (e.g., 831-834) can show the estimated rendering order of the source assets represented by the asset cells (e.g., 841-853), and/or the time needed to render each asset on the target device type in the corresponding row header (e.g., 821-824).

In various embodiments, each asset cell (e.g., 841-853) can represent a source asset. In many embodiments, the horizontal length of the asset cell in the row (e.g., 831-834) can correspond to the bandwidth score of the source asset (in bandwidth view) or the processing score of the source asset (in processing view). A identifier (e.g., name) and/or a preview image of the source asset can be included in the asset cell (e.g., 841-853), such as shown in FIG. 8. In many embodiments, the asset cells can be color coded based on asset type, such as the different source asset component types in bandwidth usage legend 713 (for the bandwidth view) or processing usage legend 723 (for the processing view).

In several embodiments, clicking on an asset cell (e.g., 841-853) can select the corresponding source asset in a 3D editor view (not shown), which can show where the object that first uses the source asset is located in the 3D scene for the location. This information can beneficially allow the author to easily edit or remove the source asset, such as when attempting to reduce the location bandwidth score, adjusted location bandwidth score, and/or adjusted location processing score for a particular location. In some embodiments, double clicking on an asset cell (e.g., 841-853) can cause the 3D editor view to "zoom" to the first object that uses the asset in the location. In various embodiments, when the author hovers over an asset cell (e.g., 841-853), a tooltip can be displayed, which can list the exact score (e.g., bandwidth score (for bandwidth view) or processing score (for processing view)) for the source asset, the time to load the source asset (for bandwidth view), the time to render the asset (for processing view), and/or other suitable information related to the asset.

Figure 9:
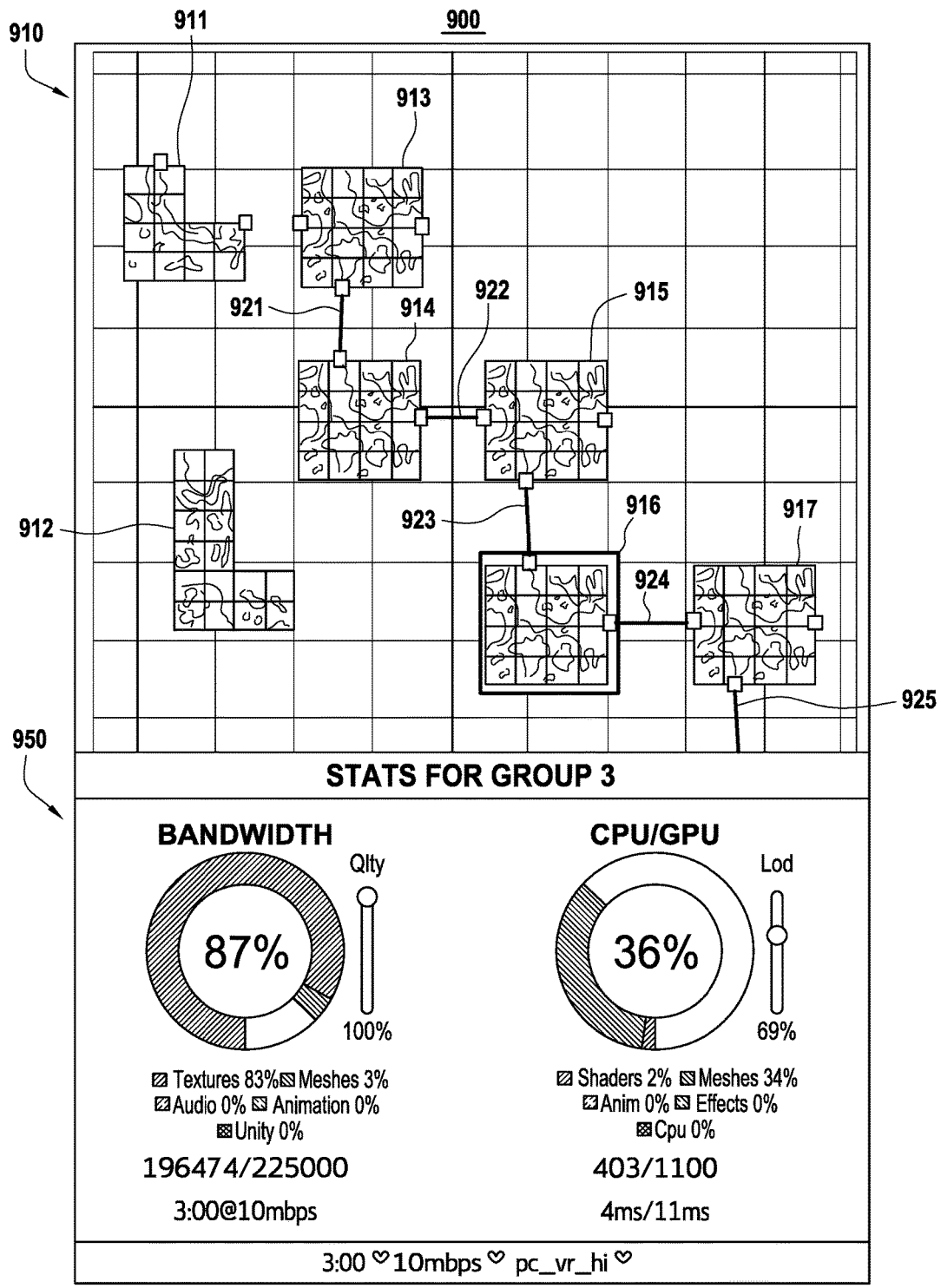
FIG. 9 illustrates a user interface display of a location graph usage panel, according to an embodiment.

Turning to the drawings, FIG. 9 illustrates a user interface display of a location graph usage panel 900, according to an embodiment. Location graph usage panel 900 is merely exemplary and embodiments of the usage gauge panel are not limited to the embodiments presented herein. The location graph usage panel can be employed in many different embodiments or examples not specifically depicted or described herein. In some embodiments, certain elements of the location graph usage panel 900 can display various pieces of information and/or perform various procedures, processes, and/or activities. In other embodiments, the pieces of information can be displayed, and/or the procedures, processes, and/or activities can be performed, by other suitable elements of location graph usage panel 900. In many embodiments, location graph usage panel 900 can be used while authoring location graphs (e.g., 300 (FIG. 3)) and/or locations within location graphs (e.g., 300 (FIG. 3)) to display bandwidth usage and/or processing usage for a location in the context of the location graph, such that the author can tailor the content in such a way that the LODs of source assets used during playback are at an acceptable level of fidelity to the author. In several embodiments, user interface 601 (FIG. 6) can display location graph usage panel 900.

In a number of embodiments, location graph usage panel 900 can include a location graph 910 and a usage gauge panel 950. Usage gauge panel 950 can be similar or identical to usage gauge panel 700 (FIG. 7), and elements of usage gauge panel 900 can be similar or identical to various elements of usage gauge panel 700 (FIG. 7). Location graph 900 can be similar to location graph 300 (FIG. 3), and elements of location graph 900 can be similar or identical to various elements of location graph 300 (FIG. 3). In many embodiments, location graph 900 can be displayed in a way that shows preview images of the locations represented by the location nodes in location graph 900. For example, location graph 900 can include location nodes 911-917, which can each be displayed by a preview image of the location represented by the location node, and can include edges 921-924, which can connect the location nodes 911-917.

In many embodiments, an author can select a location in a location graph (e.g., 910), such as the location represented by location node 916, as shown in FIG. 9, to display metrics about the location in usage gauge panel 950. In some embodiments, usage gauge panel 950 can display metrics as described above for usage gauge panel 700 (FIG. 7), with some variations based on accounting for the location in the context of the location graph (e.g., 910). For example, the source assets that can be calculated to be resident in the asset cache (e.g., 450 (FIG. 4)) due to having been loaded in a prior location can be omitted when calculating the location bandwidth score (or adjusted location bandwidth score).

As another example, the location bandwidth score (or adjusted location bandwidth score) used in calculating the metrics for usage gauge panel 950 can incorporate the sum of all location bandwidth scores (or adjusted location bandwidth score) for the next possible locations (e.g., child locations), based on the location nodes that are connected to the location node (e.g., 916) representing the currently selected location. This incorporation of the sum of location bandwidth scores (or adjusted location bandwidth scores) is based on the predictive loading for the next possible locations being performed during the target streaming time for the current location. The location bandwidth score (or adjusted location bandwidth score) that incorporates all the next possible locations can omit assets that are already in the current location or can be calculated to be residence in the asset cache (e.g., 450 (FIG. 4)).

As yet another example, any source assets in next possible locations (e.g., child locations), which can be determined to be visible from the currently selected location (e.g., using any manner of visibility techniques, manual or automatic), can be added to the adjusted location processing score for the location. In other embodiments, all of the source assets to be rendered for the location can be included in the source assets listed for the location.

In many embodiments, the systems and methods presented herein advantageously can be used for authoring, publishing, and/or distributing adaptive and predictive real-time CG content via a network (e.g., 120 (FIG. 1)) to one or more player devices (e.g., 110 (FIG. 1)) for playback with constant QOS. In many embodiments, the types of content that can be authored, published, distributed, and/or played can be interactive 3D simulations with CG content, such as fully interactive 3D video games, fully and/or semi-interactive story-driven experiences, "choose your own adventure" experiences, interactive tours, etc., as well as other suitable types of content, such as non-interactive CG movies, etc.

In a number of embodiments the systems and methods presented herein beneficially can be used utilize transient data to limit the memory and/or storage requirements of the player device (e.g., 110 (FIG. 1)) for playing the content on the player device. For example, the data used to play a content clip (e.g., 200 (FIG. 2)) can be very large (potentially greater than hundreds of megabytes (MB), or even tens or hundreds of gigabytes (GB)). This data can be hosted in the cloud and streamed locally to the player device on demand (when needed). Once the player device has consumed the data for rendering a portion of the content clip (e.g., a location), the data can be evicted to free up memory and/or storage resources for subsequent data used to play the content clip. Evicting used data can allow large content clips to play on player devices with memory/storage restraints that otherwise could not be played due to the memory/storage restraints.

In many embodiments the systems and methods presented herein advantageously can be limit the memory/storage footprint for playing content on a player device (e.g., 110 (FIG. 1)). For example, the instructions used to implement the systems (e.g., 111-116 (FIG. 1) of player device 110 (FIG. 1) can be installed on player device 110 (FIG. 1), and can be relatively small (e.g., less than 100 MB), as the source data for the content is stored on server 130 (FIG. 1).

In a number of embodiments the systems and methods presented herein can use player device 110 (FIG. 1) to render the content, which beneficially can result in a zero-latency streaming experience. Some conventional systems render content at the server (e.g., 130 (FIG. 1)) and stream the rendered frames to the player device, which can result in latency delays for rendering while the server renders and streams the rendered frames. By rendering the content at player device 110 (FIG. 1), the content can be rendered natively and in real time on player device 110 (FIG. 1), which can result in zero-latency for rendering, even though the content data is streamed from server 130 (FIG. 1).

In several embodiments, content authored using authoring system 600 (FIG. 6) can be directly publish to the Internet and/or to a cloud service for streaming using server 130 (FIG. 1), which can beneficially allow authors to focus on content creation rather and not need to create applications to run their content. In many embodiments, publishing content authored using authoring system 600 on server 130 can allow for adding new content (or modifying existing content) that can be made rapidly available on server 130 without needing to go through approval process for a new/modified application (e.g., the Apple Store app approval process). Additionally, because authored content is decoupled from the player device (e.g., 110 (FIG. 1)) and the software running on the player device, authors can advantageously rapidly publish new and/or updated content without users of player devices needing to update their software (e.g., download a new/updated app). In several embodiments, the systems and methods presented herein can be used to create a general purpose hub or portal (similar to Netflix or YouTube), which can allow player devices (e.g., 110 (FIG. 1)) to stream interactive (e.g., non-linear) 3D content, which can allow for zero latency and no pauses while streaming once the content has begun to play.

In many embodiments, embodiments the systems and methods presented herein can provide constant QOS despite variable data bandwidths and/or variable computational power and/or memory capabilities of player devices (e.g., 110 (FIG. 1)). For example, depending on the network environment (e.g., of network 120 (FIG. 1)), such as whether the network is mobile data, cable, DSL (digital subscriber line), fiber, etc., the available data bandwidth for streaming content can be variable and not predictable. Even on the same network environment (e.g., a home Wi-Fi DSL connection), bandwidth can be subject to fluctuations on global network load. The systems and methods described herein can account for such variations and fluctuations to maintain constant QOS.

In several embodiments, the systems and methods presented herein can advantageously be designed cross-platform for different types of player devices (e.g., 110 (FIG. 1)), such as ranging from very powerful PC or VR systems to modestly powerful mobile devices (e.g., smartphones, tablets). In many embodiments, the systems and methods described herein can adapt the source data of the content to provide constant QOS on a variety of device types with a variety of memory/storage constraints and/or processing (e.g., CPU/GPU) constraints.

In a number of embodiments, the systems and methods presented herein can allow for instant streaming of non-linear datasets. Generally, streaming data is linear data (e.g., traditional movies). Interactive games/simulations are generally not linear, such that it can be difficult to predict which content will be needed at a certain time, and how to efficiently stream the content without interruptions or buffering. The systems and methods provided herein can allow for authoring and playing of content that can be stream in a non-linear fashion with constant QOS. For example, the playback can involve a smooth, instant streaming experience with no (or very limited) pauses or buffering. In many embodiments, the authors can easily and/or efficiently create and publish interactive CG content for streaming across a wide variety of devices and bandwidths.

In some conventional approaches, streaming of interactive content is provided without any provision for constant QOS. For example, some video games stream content and begin to play with a minimal amount of source assets downloaded, and continue playback as source assets continue to load (and begin to be rendered as they are loaded). These approaches typically lack the guarantee that the content will include the source assets designed for a location by the author, and typically lack the guarantee of constant QOS. The systems and methods described herein, by contrast, can provide such guarantees.

In other conventional approaches, streaming of interactive content can involve downloading pieces of content at a time, playing the content, then downloading the next piece of content while the user waits for the next piece content to load. In several embodiments, the systems and methods presented herein can beneficially allow seamless streaming of content across multiple locations and/or pieces of content without pauses for downloading.

In still other conventional approaches, streaming video providers can provide a guarantee that the content will not pause for downloading or rendering. Such content, however, is not interactive CG content, so it is very easy to estimate the bandwidth and processing resources needed for the linear content. The systems and methods presented herein can advantageously allow for constant QOS when streaming interactive CG content, which beneficially addresses the much more difficult challenges of handling non-linear streaming and rendering CG content. For example, unlike traditional video, in which rendering simply involves displaying each frame of linear content, rendering CG content can involve computationally intensive operations to render the CG content (e.g., render the meshes, shaders, etc.) and present each frame. As another example, unlike linear content, in which the next piece of data to be downloaded can be readily determined as the subsequent data in the linear content, non-linear content involves decisions made by users during playback, which can affect the next piece of content that will need to be played back.

Figure 10:
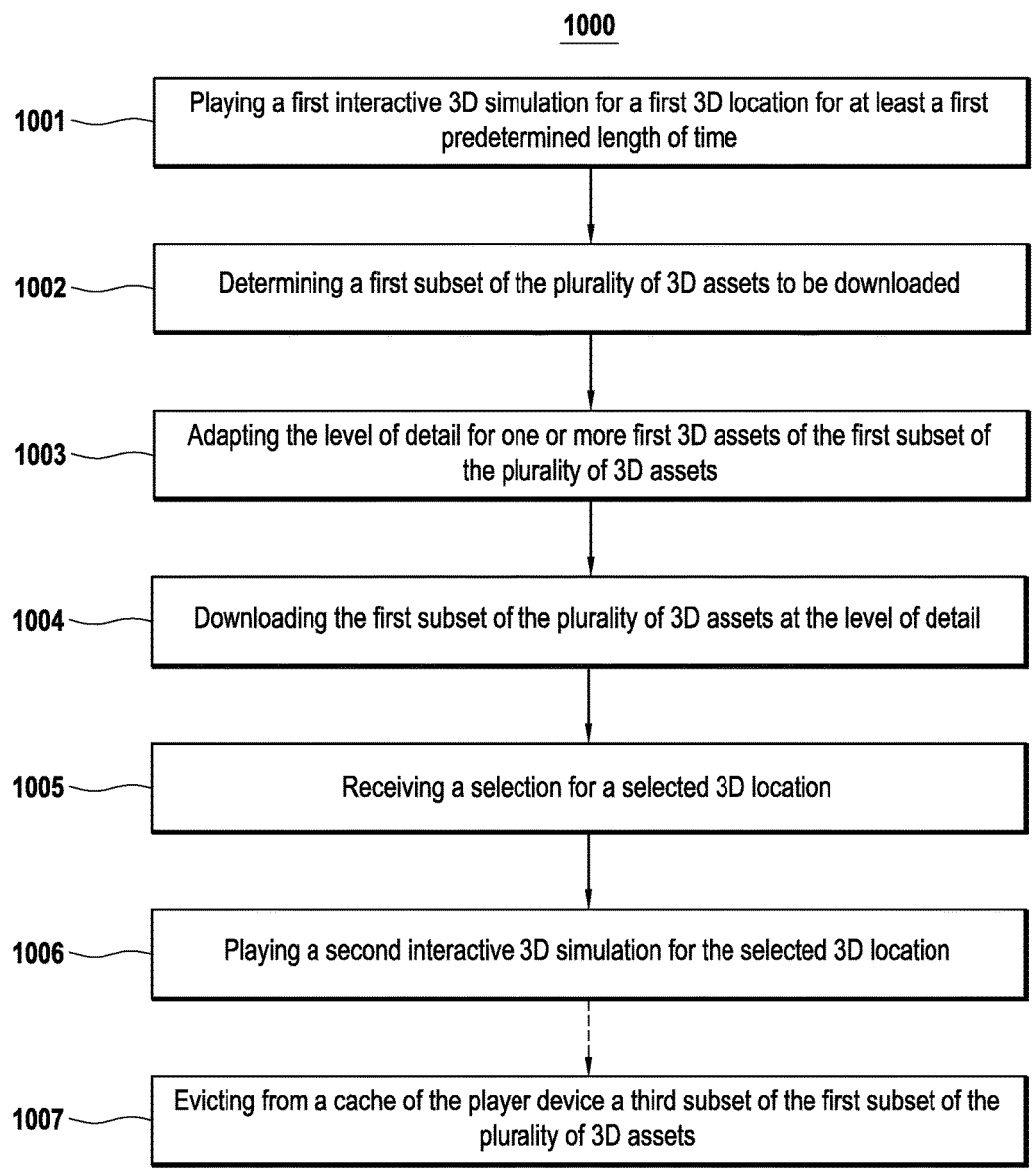
FIG. 10 illustrates a flow chart for a method, according to another embodiment.

Turning ahead in the drawings, FIG. 10 illustrates a flow chart for a method 1000. In some embodiments, method 1000 can be a method of predictive bi-adaptive streaming of real-time interactive CG content. Method 1000 is merely exemplary and is not limited to the embodiments presented herein. Method 1000 can be employed in many different embodiments or examples not specifically depicted or described herein. In some embodiments, the procedures, the processes, and/or the activities of method 1000 can be performed in the order presented. In other embodiments, the procedures, the processes, and/or the activities of method 1000 can be performed in any suitable order. In still other embodiments, one or more of the procedures, the processes, and/or the activities of method 1000 can be combined or skipped. In some embodiments, method 1000 can be performed by player device 110 (FIG. 1).

Referring to FIG. 10, method 1000 can include a block 1001 of playing a first interactive 3D simulation for a first 3D location of a CG content clip for at least a first predetermined length of time. In many embodiments, the interactive 3D simulation can be played on player device 110 (FIG. 1). The first 3D location can be similar or identical to a location represented by a location node in a location graph (e.g., location graph 300 (FIG. 3) and/or location graph 910 (FIG. 9)). The first predetermined length of time can be similar or identical to the target streaming time for the first 3D location. The CG content clip can be similar or identical to content clip 200 (FIG. 2). In many embodiments, the CG content clip can include a plurality of 3D locations renderable using a plurality of 3D assets each at a level of detail. The plurality of 3D locations can be similar or identical to locations represented by location nodes in a location graph (e.g., location graph 300 (FIG. 3) and/or location graph 910 (FIG. 9)). The 3D assets can be similar or identical to source assets for the location, and the level of detail can be similar or identical to the LOD for the source assets, as described above. In several embodiments, and the plurality of 3D locations can include the first 3D location. In many embodiments, block 1001 can be performed at least in part by playing system 111 (FIG. 1).

In many embodiments, method 1000 can include blocks 1002-1004, described below, while playing the first interactive 3D simulation in block 1001 and within the first predetermined length of time.

In several embodiments, block 1002 can include determining a first subset of the plurality of 3D assets to be downloaded for rendering two or more second 3D locations of the plurality of 3D locations. In many embodiments, the two or more second 3D locations can be selectable options for playback directly subsequent to playing the first interactive 3D simulation for the first 3D location. For example, the two or more second 3D locations can be similar or identical to next possible locations (e.g., child locations) in a location graph (e.g., location graph 300 (FIG. 3) and/or location graph 910 (FIG. 9)). In some embodiments, the first subset of the plurality of 3D assets can be the 3D assets to be predictively loaded for the two or more second 3D locations during playback of the first 3D location. In many embodiments, block 1002 can be performed at least in part by location system 112 (FIG. 1) and/or cache management system 116 (FIG. 1).

In some embodiments, block 1002 can include determining one or more second 3D assets of the plurality of assets for rendering the two or more second 3D locations that are already in a cache of the player device, such that the one or more second 3D assets are not included in the first subset of the plurality of 3D assets to be downloaded for rendering the two or more second 3D locations. The cache can be similar or identical to asset cache 450 (FIG. 4). For example, the one or more second 3D assets can be similar or identical to source assets in asset cache 450 (FIG. 4), and can be not included in the predictive loading.

In various embodiments, block 1002 can include using a location graph including a plurality of locations nodes each representing a different one of the plurality of 3D locations to determine the two or more second 3D locations of the plurality of 3D locations. The location graph can be similar or identical to location graph 300 (FIG. 3) and/or location graph 910 (FIG. 9). The location nodes can be similar or identical to location nodes 311, 321-322, 331335, 341-345 in FIG. 3 and/or location graph 911-917 of FIG. 9. In some embodiments, the location graph is a directed graph. In various embodiments, the location graph is a cyclic graph.

In several embodiments, block 1003 can include adapting the level of detail for one or more first 3D assets of the first subset of the plurality of 3D assets based at least in part on (a) a bandwidth for downloading the first subset of the plurality of 3D assets from a server to the player device through a network, and (b) a processing power of the player device. The network can be similar or identical to network 120 (FIG. 1). The server can be similar or identical to server 130 (FIG. 1). For example, adapting the level of detail for the bandwidth can be similar or identical to the process for adapting for bandwidth described above, and/or adapting the level of detail for the processing power of the player device can be similar or identical to the process for adapting for processing described above. In many embodiments, block 1003 can be performed at least in part by bandwidth management system 113 (FIG. 1), processing management system 114 (FIG. 1), and/or LOD management system 115 (FIG. 1).

In some embodiments, block 1003 can include adapting the level of detail for the one or more first 3D assets of the first subset of the plurality of 3D assets based at least in part on a current running average of the bandwidth.

In various embodiments, block 1003 can include determining whether the first subset of the plurality of 3D assets can be downloaded through the network within the first predetermined length of time when the level of detail for each of the first subset of the plurality of 3D assets is a highest level of detail. If the first subset of the plurality of 3D assets cannot be downloaded through the network within the first predetermined length of time when the level of detail for each of the first subset of the plurality of 3D assets is a highest level of detail, block 1003 can include decreasing the level of detail for the one or more first 3D assets of the first subset of the plurality of 3D assets until the first subset of the plurality of 3D assets can be downloaded within the first predetermined length of time.

In some embodiments, block 1003 can include using a bandwidth score for the level of detail for each of the first subset of the plurality of 3D assets to determine whether the first subset of the plurality of 3D assets can be downloaded within the first predetermined length of time.

In various embodiments, block 1003 can include adapting the level of detail for the one or more first 3D assets of the first subset of the plurality of 3D assets based at least in part on a current running average of the processing power of the player device.

In some embodiments, block 1003 can include determining whether a subset of the first subset of the plurality of 3D assets for rendering each of the second 3D locations can be rendered within a predetermined framerate using the level of detail as currently set. For each of the second 3D locations, if the subset of the first subset of the plurality of 3D assets for rendering the second 3D location cannot be rendered within the predetermined framerate, block 1003 can include decreasing the level of detail for one or more 3D assets of the subset of the first subset of the plurality of 3D assets until the subset of the first subset of the plurality of 3D assets can be rendered within the predetermined frame rate. In many embodiments, the one or more first 3D assets can include each of the one or more 3D assets of each of the subsets of the first subset of the plurality of 3D assets.

In various embodiments, block 1003 can include using a processing score for the level of detail for each of the first subset of the plurality of 3D assets to determine whether each subset of the first subset of the plurality of 3D assets for rendering each of the second 3D locations can be rendered within a predetermined framerate. The predetermined framerate can be similar or identical to the target framerate.

In some embodiments, block 1003 can include determining the one or more first 3D assets of the first subset of the plurality of 3D assets for adapting the level of detail, based on priority levels of the first subset of the plurality of 3D assets. The priority level can be similar or identical to the priority levels set by the author for the source assets, as described above.

In a number of embodiments, block 1004 can include downloading the first subset of the plurality of 3D assets at the level of detail as adapted for the bandwidth and the processing power. In many embodiments, the first subset of the plurality of 3D assets can be streamed, as described above. In many embodiments, block 1004 can be performed at least in part by playing system 111 (FIG. 1) and/or location system 112 (FIG. 1), and/or cache management system 116 (FIG. 1).

In several embodiments, method 1000 additionally can include, after the first predetermined length of time, a block 1005 of receiving a selection for a selected 3D location of the two or more second 3D locations. For example, a user of the player can interactively select the selected 3D location as the next location from the two or more second 3D locations. In many embodiments, block 1005 can be performed at least in part by playing system 111 (FIG. 1) and/or location system 112 (FIG. 1).

In a number of embodiments, method 1000 further can include a block 1006 of playing a second interactive 3D simulation for the selected 3D location using at least a second subset of the first subset of the plurality of 3D assets. In many embodiments, the second interactive 3D simulation can be played devoid of delays for downloading and rendering the second interactive 3D simulation. For example, the second interactive 3D simulation can be played immediately upon selection of the selected 3D location without delays for downloading or rendering. In many embodiments, the first and second interactive 3D simulations can be played seamlessly without delays for downloading or rendering. In many embodiments, block 1006 can be performed at least in part by location system 112 (FIG. 1).

In several embodiments, method 1000 optionally can include, after block 1005 of receiving the selection for the selected 3D location of the two or more second 3D locations, a block 1007 of evicting from a cache of the player device a third subset of the first subset of the plurality of 3D assets. In many embodiments, the third subset of the first subset of the plurality of 3D assets can be devoid of any of the second subset of the first subset of the plurality of 3D assets. For example, the second subset of the first subset of the plurality of 3D assets can be used to play the selected 3D location, and the third subset of the first subset of the plurality of 3D assets can be assets downloaded for the other location of the two or more second 3D location that were not selected, and those assets can be evicted. The cache can be similar or identical to asset cache 450 (FIG. 4). In many embodiments, block 1002 can be performed at least in part by cache management system 116 (FIG. 1).

Figure 11:
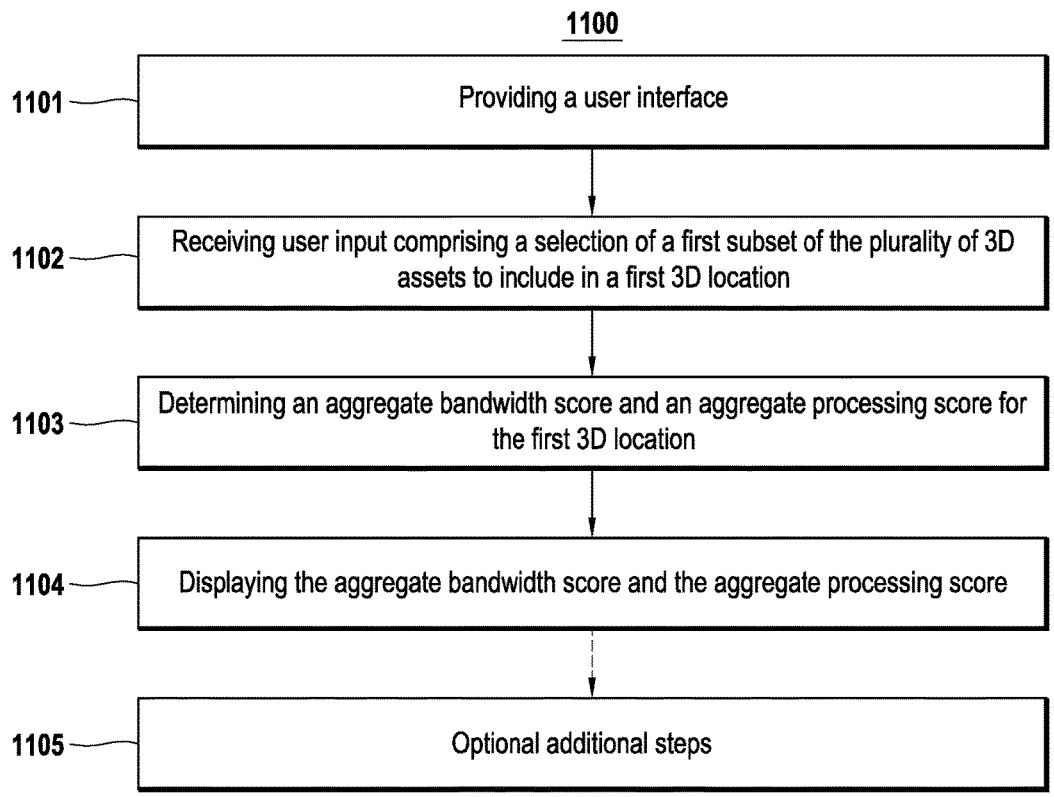
FIG. 11 illustrates a flow chart for a method, according to another embodiment.

Turning ahead in the drawings, FIG. 11 illustrates a flow chart for a method 1100. In some embodiments, method 1100 can be a method of authoring of real-time interactive CG content for predictive bi-adaptive streaming. Method 1100 is merely exemplary and is not limited to the embodiments presented herein. Method 1100 can be employed in many different embodiments or examples not specifically depicted or described herein. In some embodiments, the procedures, the processes, and/or the activities of method 1100 can be performed in the order presented. In other embodiments, the procedures, the processes, and/or the activities of method 1100 can be performed in any suitable order. In still other embodiments, one or more of the procedures, the processes, and/or the activities of method 1100 can be combined or skipped. In some embodiments, method 1100 can be performed by authoring system 600 (FIG. 6).

Referring to FIG. 11, method 1100 can include a block 1101 of providing a user interface configured to allow a user to edit at least a portion of a computer graphics (CG) content clip that includes a plurality of 3D locations renderable using a plurality of 3D assets. The user interface can be similar or identical to user interface 601 (FIG. 6). The CG content clip can be similar or identical to content clip 200 (FIG. 2). The 3D locations can be similar or identical to locations represented by location nodes in a location graph (e.g., location graph 300 (FIG. 3) and/or location graph 910 (FIG. 9)). The 3D assets can be similar or identical to source assets for the location.

In a number of embodiments, method 1100 also can include a block 1102 of receiving first user input that includes a selection of a first subset of the plurality of 3D assets to include in a first 3D location of the plurality of 3D locations. The first 3D location can be similar or identical to a location represented by a location node in a location graph (e.g., location graph 300 (FIG. 3) and/or location graph 910 (FIG. 9)). In many embodiments, block 1104 can be performed at least in part by user interface 601 (FIG. 6).

In several embodiments, method 1100 additionally can include a block 1103 of determining an aggregate bandwidth score and an aggregate processing score for the first 3D location including the first subset of the plurality of 3D assets. The aggregate bandwidth score can be similar or identical to the location bandwidth score (or adjusted location bandwidth score) described above. The aggregate processing score can be similar or identical to the adjusted location processing score described above. In various embodiments, the aggregate bandwidth score can be based at least in part on individual bandwidth scores for each of the first subset of the plurality of 3D assets. In some embodiments, the aggregate processing score can be based at least in part on individual processing scores for each of the first subset of the plurality of 3D assets. In many embodiments, block 1103 can be performed at least in part by bandwidth calculation system 604 (FIG. 6) and/or processing calculation system 605 (FIG. 6).

In a number of embodiments, method 1100 further can include a block 1104 of displaying in the user interface information based at least in part on the aggregate bandwidth score and the aggregate processing score for first subset of the plurality of 3D assets included in the first 3D location. For example, the information can be displayed similar or identical to various metrics in usage gauge panel 700 (FIG. 7) or elements thereof, such as the location bandwidth score (or adjusted location bandwidth score) displayed in bandwidth numeric comparison label 714 (FIG. 7), the adjusted location processing score displayed in processing numeric comparison label 724 (FIG. 7), the bandwidth usage displayed in bandwidth usage circle graph 711 (FIG. 7) and bandwidth usage label 712 (FIG. 7), and/or the processing usage displayed in processing usage circle graph 721 (FIG. 7) and processing usage label 722 (FIG. 7). In many embodiments, block 1104 can be performed at least in part by user interface 601 (FIG. 6).

In several embodiments, method 1100 additionally can include a block 1105 of optional additional steps. In some embodiments, block 1105 can be implemented by one or more of methods 1200 (FIG. 12), 1300 (FIG. 13), 1400 (FIG. 14), 1500 (FIG. 15), 1600 (FIG. 16), and/or 1700 (FIG. 17), as described below. In some embodiments, block 1105 can include receiving fifth user input that includes a selection of a priority level for one or more of the plurality of 3D assets. For example, an author using authoring system 600 (FIG. 6) can set a priority level of one or more source asset, such 3D assets. In various embodiments, block 1105 can include displaying in the user interface a 3D representation of the first 3D location at a level of detail selected for the first subset of the plurality of 3D assets. The 3D representation can be similar or identical to the scene view described above. In many embodiments, block 1105 can include generating the individual bandwidth scores and the individual processing scores for each of the first subset of the plurality of 3D assets. In some embodiments, block 1105 can include displaying in the user interface a representation of a contribution of each of the first subset of the plurality of 3D assets to at least one of the aggregate bandwidth score or the aggregate processing score. For example, the representation can be similar or identical to breakout score view 800 (FIG. 8).

Figure 12:
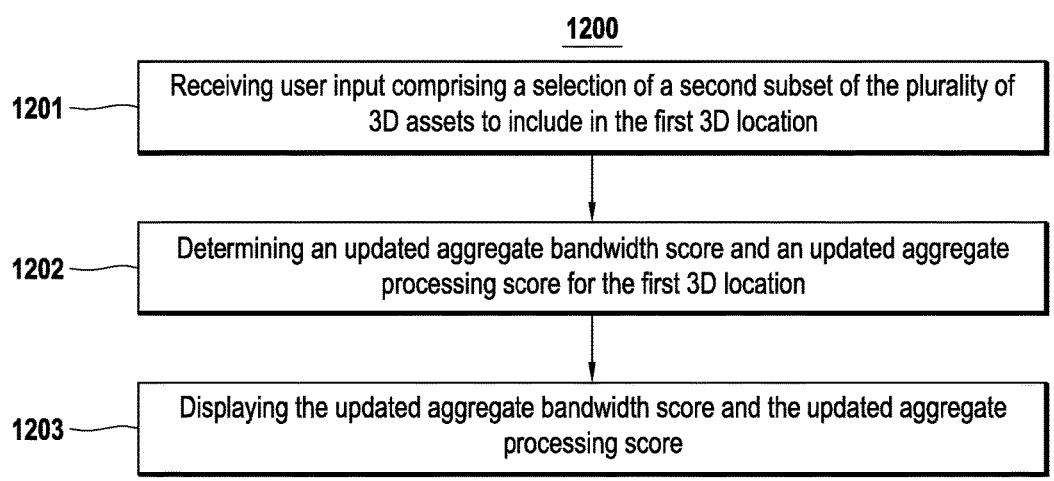
FIG. 12 illustrates a method, which can be an embodiment of a block of the method of FIG. 11.

Turning ahead in the drawings, FIG. 12 illustrates a method 1200, according to an embodiment, which can be an embodiment of block 1105 (FIG. 11). Referring to FIG. 12, method 1200 can include a block 1201 of receiving second user input that includes a selection of a second subset of the plurality of 3D assets to include in the first 3D location of the plurality of 3D locations. In some embodiments, the second subset of the plurality of 3D assets can be at least partially different from the first subset of the plurality of 3D assets. For example, the author can edit the 3D assets included in the first 3D location. In many embodiments, block 1201 can be performed at least in part by user interface 601 (FIG. 6).

In a number of embodiments, method 1200 also can include a block 1202 of determining an updated aggregate bandwidth score and an updated aggregate processing score for the first 3D location including the second subset of the plurality of 3D assets. In many embodiments, the updated aggregate bandwidth score can be based at least in part on individual bandwidth scores for each of the second subset of the plurality of 3D assets. In some embodiments, and the updated aggregate processing score can be based at least in part on individual processing scores for each of the second subset of the plurality of 3D assets. In many embodiments, block 1202 can be performed at least in part by bandwidth calculation system 604 (FIG. 6) and/or processing calculation system 605 (FIG. 6).

In several embodiments, method 1200 additionally can include a block 1203 of displaying in the user interface updated information based at least in part on the updated aggregate bandwidth score and the updated aggregate processing score for the second subset of the plurality of 3D assets included in the first 3D location. For example, the updated information can be displayed similar or identical to various metrics in usage gauge panel 700 (FIG. 7) or elements thereof, such as the location bandwidth score (or adjusted location bandwidth score) displayed in bandwidth numeric comparison label 714 (FIG. 7), the adjusted location processing score displayed in processing numeric comparison label 724 (FIG. 7), the bandwidth usage displayed in bandwidth usage circle graph 711 (FIG. 7) and bandwidth usage label 712 (FIG. 7), and/or the processing usage displayed in processing usage circle graph 721 (FIG. 7) and processing usage label 722 (FIG. 7). In many embodiments, block 1203 can be performed at least in part by user interface 601 (FIG. 6).

Figure 13:
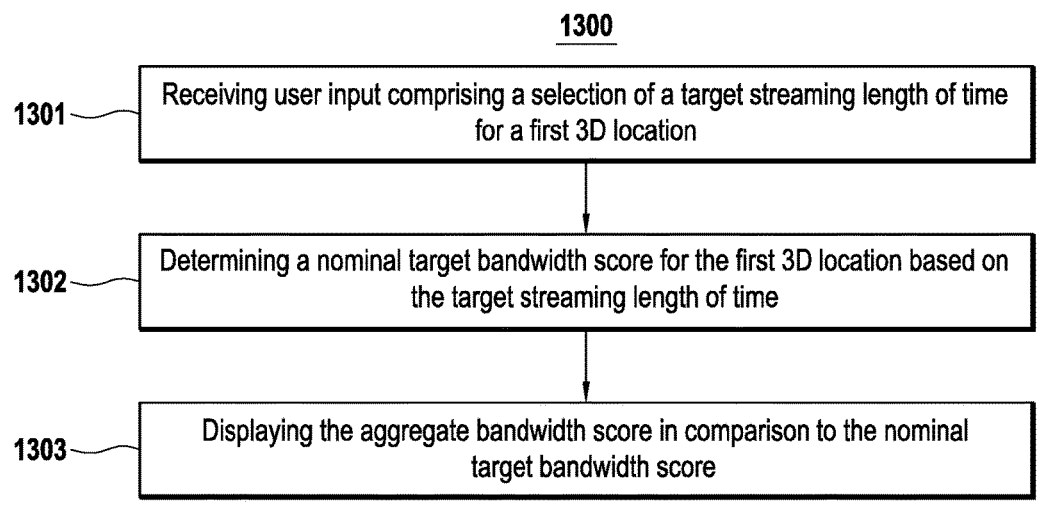
FIG. 13 illustrates a method, which can be an embodiment of a block of the method of FIG. 11.

Turning ahead in the drawings, FIG. 13 illustrates a method 1300, according to an embodiment, which can be an embodiment of block 1105 (FIG. 11). Referring to FIG. 13, method 1300 can include a block 1301 of receiving third user input that includes a selection of a target streaming length of time for a first 3D location of the plurality of 3D locations. The target streaming length of time can be similar or identical to target streaming time, as set in target streaming time selector 731 (FIG. 7). In many embodiments, block 1301 can be performed at least in part by user interface 601 (FIG. 6).

In a number of embodiments, method 1300 also can include a block 1302 of determining a nominal target bandwidth score for the first 3D location based on the target streaming length of time. The nominal target bandwidth score can be similar or identical to the nominal target bandwidth score described above, such as shown in bandwidth numeric comparison label 714 (FIG. 7). In many embodiments, block 1302 can be performed at least in part by bandwidth calculation system 604 (FIG. 6).

In several embodiments, method 1300 additionally can include a block 1303 of displaying in the user interface the aggregate bandwidth score in comparison to the nominal target bandwidth score. For example, the aggregate bandwidth score can be displayed in comparison to the nominal target bandwidth score similarly or identical to how the location bandwidth score (or adjusted location bandwidth score) is displayed in comparison to the nominal target bandwidth score in bandwidth numeric comparison label 714 (FIG. 7). In many embodiments, block 1303 can be performed at least in part by user interface 601 (FIG. 6).

Figure 14:
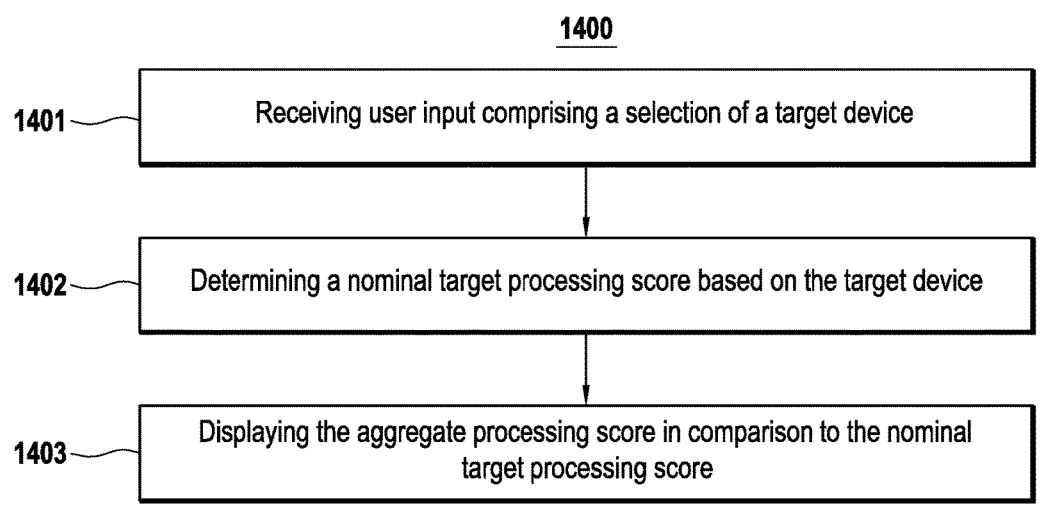
FIG. 14 illustrates a method, which can be an embodiment of a block of the method of FIG. 11.

Turning ahead in the drawings, FIG. 14 illustrates a method 1400, according to an embodiment, which can be an embodiment of block 1105 (FIG. 11). Referring to FIG. 14, method 1400 can include a block 1401 of receiving fourth user input that includes a selection of a target device. The target device can be similar or identical to the target device type selected in target device selector 733 (FIG. 7). In many embodiments, block 1401 can be performed at least in part by user interface 601 (FIG. 6).

In a number of embodiments, method 1400 also can include a block 1402 of determining a nominal target processing score based on the target device. The nominal target processing score can be similar or identical to the nominal target processing score described above, such as shown in processing numeric comparison label 724 (FIG. 7). In many embodiments, block 1402 can be performed at least in part by processing calculation system 605 (FIG. 6).

In several embodiments, method 1400 additionally can include a block 1403 of displaying in the user interface the aggregate processing score in comparison to the nominal target processing score. For example, the aggregate processing score can be displayed in comparison to the nominal target processing score similarly or identical to how the adjusted location processing score is displayed in comparison to the nominal target processing score in processing numeric comparison label 724 (FIG. 7). In many embodiments, block 1403 can be performed at least in part by user interface 601 (FIG. 6).

Figure 15:
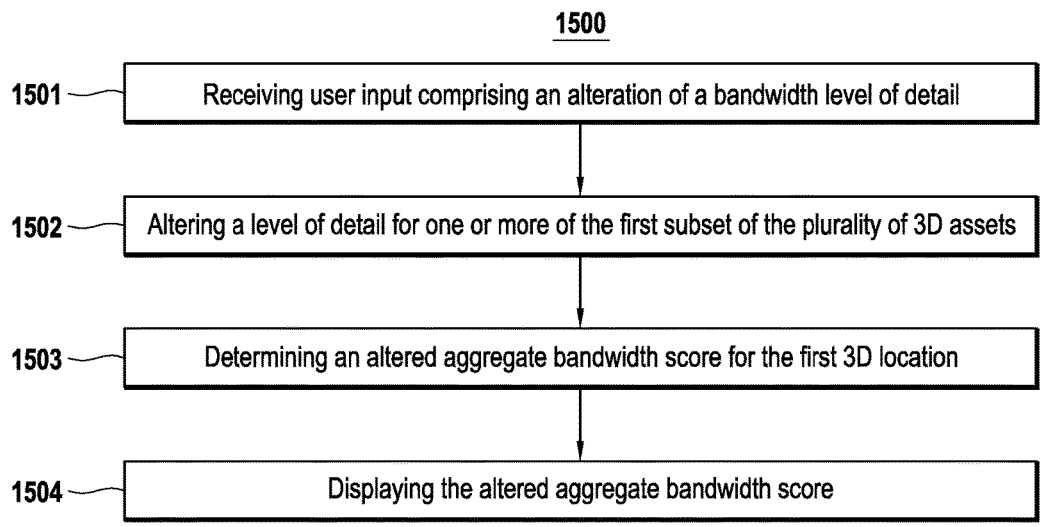
FIG. 15 illustrates a method, which can be an embodiment of a block of the method of FIG. 11.

Turning ahead in the drawings, FIG. 15 illustrates a method 1500, according to an embodiment, which can be an embodiment of block 1105 (FIG. 11). Referring to FIG. 15, method 1500 can include a block 1501 of receiving sixth user input that includes an alteration of a bandwidth level of detail. For example, the bandwidth level of detail can be similar or identical to the quality level selected in quality level selector 716 (FIG. 7). In many embodiments, block 1501 can be performed at least in part by user interface 601 (FIG. 6).

In a number of embodiments, method 1500 also can include a block 1502 of altering a level of detail for one or more of the first subset of the plurality of 3D assets based on priority levels of the first subset of the plurality of 3D assets. For example, the LOD for the source assets can be altered based on the quality level, as described above. In many embodiments, block 1502 can be performed at least in part by quality adjustment system 606 (FIG. 6).

In several embodiments, method 1500 additionally can include a block 1503 of determining an altered aggregate bandwidth score for the first 3D location including the first subset of the plurality of 3D assets. In many embodiments, the altered aggregate bandwidth score can be based at least in part on individual bandwidth scores for each of the first subset of the plurality of 3D assets at the level of detail as altered. For example, the altered aggregated bandwidth score can be the adjusted location bandwidth score, as updated based on the alterations made to the LODs due to the adjusted quality level in block 1502. In many embodiments, block 1503 can be performed at least in part by bandwidth calculation system 604 (FIG. 6).

In a number of embodiments, method 1500 further can include a block 1504 of displaying in the user interface updated information based at least in part on the altered aggregate bandwidth score. For example, the updated information can be displayed similar or identical to various metrics in usage gauge panel 700 (FIG. 7) or elements thereof, such as the location bandwidth score (or adjusted location bandwidth score) displayed in bandwidth numeric comparison label 714 (FIG. 7), and/or the bandwidth usage displayed in bandwidth usage circle graph 711 (FIG. 7) and bandwidth usage label 712 (FIG. 7). In many embodiments, block 1504 can be performed at least in part by user interface 601 (FIG. 6).

Figure 16:
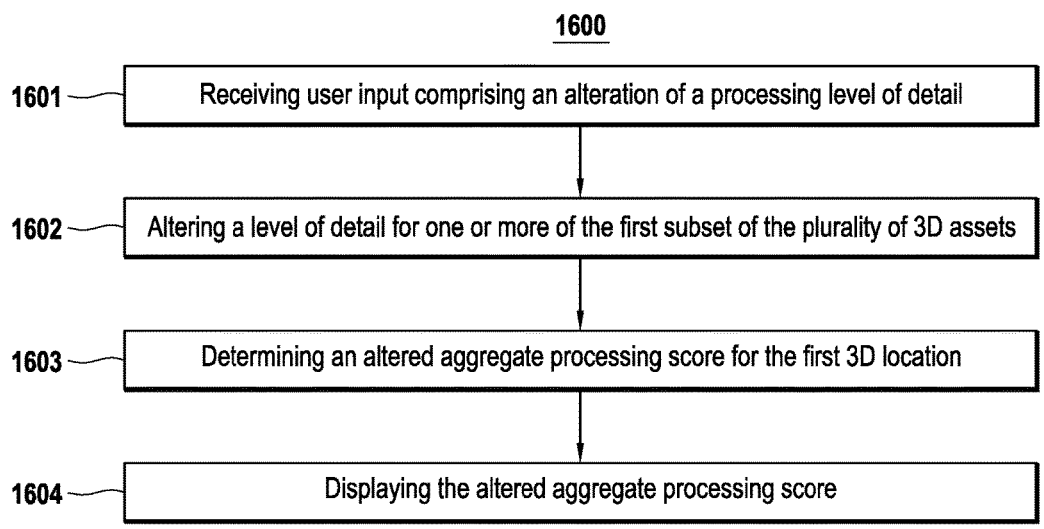
FIG. 16 illustrates a method, which can be an embodiment of a block of the method of FIG. 11.

Turning ahead in the drawings, FIG. 16 illustrates a method 1600, according to an embodiment, which can be an embodiment of block 1105 (FIG. 11). Referring to FIG. 16, method 1600 can include a block 1601 of receiving seventh user input that includes an alteration of a processing level of detail. For example, the processing level of detail can be similar or identical to the LOD level selected in LOD level selector 726 (FIG. 7). In many embodiments, block 1601 can be performed at least in part by user interface 601 (FIG. 6).

In a number of embodiments, method 1600 also can include a block 1602 of altering a level of detail for one or more of the first subset of the plurality of 3D assets based on priority levels of the first subset of the plurality of 3D assets. For example, the LOD for the source assets can be altered based on the LOD level, as described above. In many embodiments, block 1602 can be performed at least in part by LOD adjustment system 607 (FIG. 6).

In several embodiments, method 1600 additionally can include a block 1603 of determining an altered aggregate processing score for the first 3D location including the first subset of the plurality of 3D assets. In many embodiments, the altered aggregate processing score can be based at least in part on individual processing scores for each of the first subset of the plurality of 3D assets at the level of detail as altered. For example, the altered aggregated processing score can be the adjusted location processing score, as updated based on the alterations made to the LODs due to the adjusted quality level in block 1602. In many embodiments, block 1603 can be performed at least in part by processing calculation system 605 (FIG. 6).

In a number of embodiments, method 1600 further can include a block 1604 of displaying in the user interface updated information based at least in part on the altered aggregate processing score. For example, the updated information can be displayed similar or identical to various metrics in usage gauge panel 700 (FIG. 7) or elements thereof, such as the adjusted location processing score displayed in processing numeric comparison label 714 (FIG. 7), and/or the processing usage displayed in processing usage circle graph 711 (FIG. 7) and processing usage label 712 (FIG. 7). In many embodiments, block 1604 can be performed at least in part by user interface 601 (FIG. 6).

Figure 17:
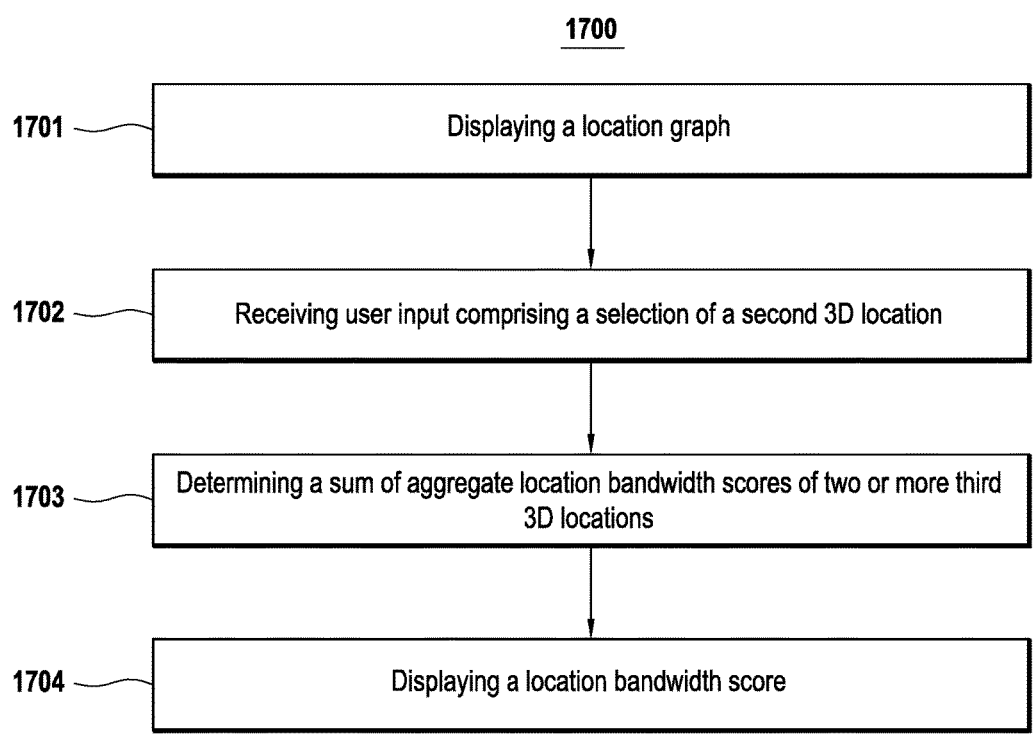
FIG. 17 illustrates a method, which can be an embodiment of a block of the method of FIG. 11.

Turning ahead in the drawings, FIG. 17 illustrates a method 1700, according to an embodiment, which can be an embodiment of block 1105 (FIG. 11). Referring to FIG. 17, method 1700 can include a block 1701 of displaying in the user interface a location graph. The location graph can be similar or identical to location graph 300 (FIG. 3) and/or location graph 910 (FIG. 9). For example, the location graph can be displayed in the user interface such as location graph 910 in FIG. 9. In many embodiments, block 1701 can be performed at least in part by user interface 601 (FIG. 6) and/or location system 602 (FIG. 6).

In a number of embodiments, method 1700 also can include a block 1702 of receiving eighth user input that includes a selection of a second 3D location of the plurality of 3D locations. For example, the second 3D location can be similar or identical to the location represented by location node 916 in location graph 910 (FIG. 9). In many embodiments, block 1702 can be performed at least in part by user interface 601 (FIG. 6) and/or location system 602 (FIG. 6).

In several embodiments, method 1700 additionally can include a block 1703 of determining a sum of aggregate location bandwidth scores of two or more third 3D locations of the plurality of 3D locations. In many embodiments, the two or more third 3D locations can be child locations of the second 3D location. In many embodiments, block 1703 can be performed at least in part by bandwidth calculation system 604 (FIG. 6). In many embodiments, the aggregate location bandwidth scores can be similar or identical to the location bandwidth score (or adjusted location bandwidth scores) for the two or more third 3D locations.

In a number of embodiments, method 1700 further can include a block 1704 of displaying in the user interface updated information based at least in part on a location bandwidth score that is based at least in part on the sum of the aggregate location bandwidth scores. In many embodiments, block 1704 can be performed at least in part by user interface 601 (FIG. 6).

Figure 19:
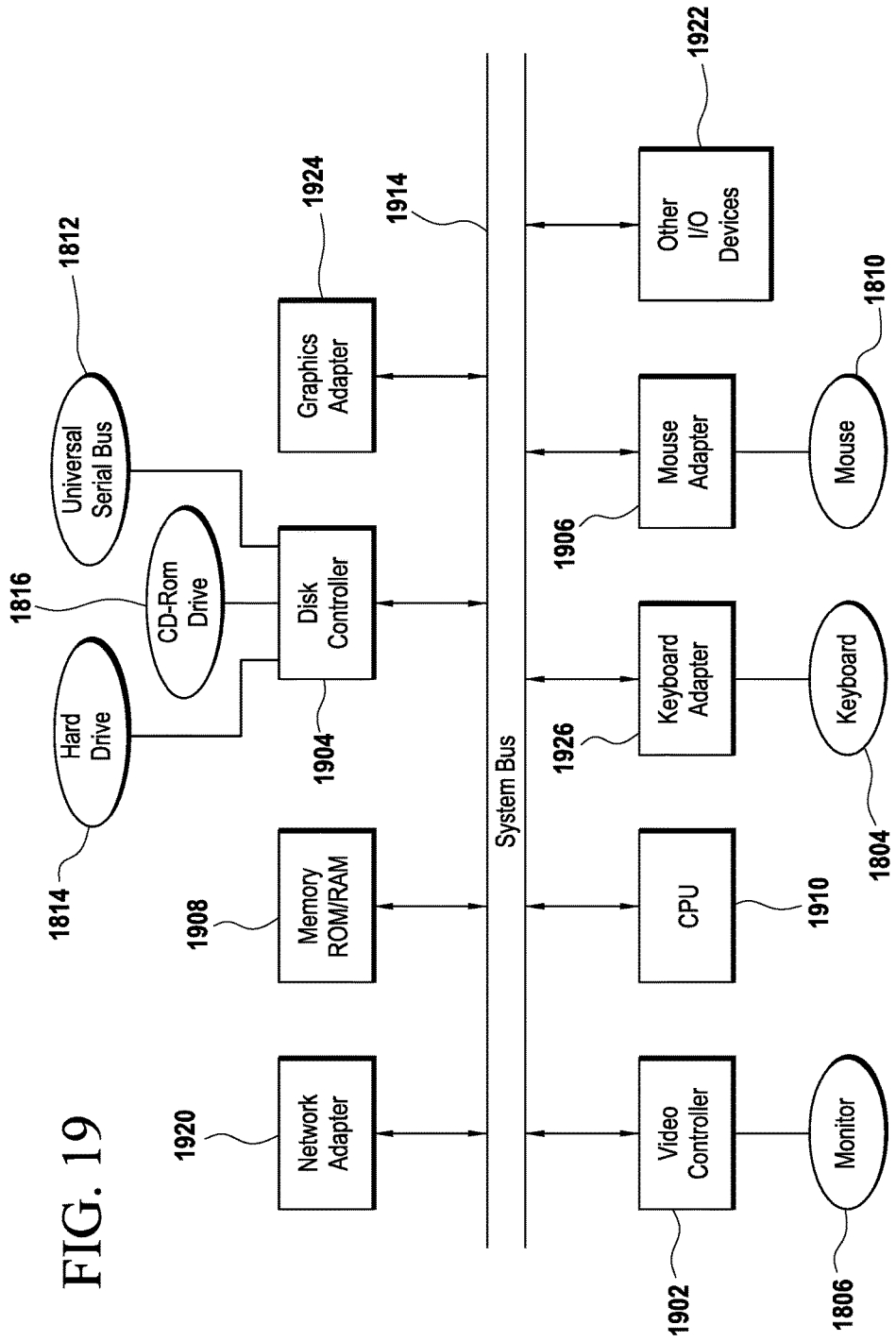
FIG. 19 illustrates a representative block diagram of an example of elements included in circuit boards inside a chassis of the computer of FIG. 18.

Turning ahead in the drawings, FIG. 18 illustrates a computer system 1800, all of which or a portion of which can be suitable for implementing an embodiment of at least a portion of player device 110 (FIG. 1), server 130 (FIG. 1), authoring system 600 (FIG. 6), and/or methods 1000 (FIG. 10), 1100 (FIG. 11), 1200 (FIG. 12), 1300 (FIG. 13), 1400 (FIG. 14), 1500 (FIG. 15), 1600 (FIG. 16), and/or 1700 (FIG. 17). Computer system 1800 includes a chassis 1802 containing one or more circuit boards (not shown), a USB (universal serial bus) port 1812, a Compact Disc Read-Only Memory (CD-ROM) and/or Digital Video Disc (DVD) drive 1816, and a hard drive 1814. A representative block diagram of the elements included on the circuit boards inside chassis 1802 is shown in FIG. 19. A central processing unit (CPU) 1910 in FIG. 19 is coupled to a system bus 1914 in FIG. 19. In various embodiments, the architecture of CPU 1910 can be compliant with any of a variety of commercially distributed architecture families.

Continuing with FIG. 19, system bus 1914 also is coupled to memory 1908 that includes both read only memory (ROM) and random access memory (RAM). Non-volatile portions of memory storage unit 1908 or the ROM can be encoded with a boot code sequence suitable for restoring computer system 1800 (FIG. 18) to a functional state after a system reset. In addition, memory 1908 can include microcode such as a Basic Input-Output System (BIOS). In some examples, the one or more memory storage units of the various embodiments disclosed herein can include memory storage unit 1908, a USB-equipped electronic device (e.g., an external memory storage unit (not shown) coupled to universal serial bus (USB) port 1812 (FIGS. 18-19)), hard drive 1814 (FIGS. 18-19), and/or CD-ROM, DVD, Blu-Ray, or other suitable media, such as media configured to be used in CD-ROM or DVD drive 1816 (FIGS. 18-19). In the same or different examples, the one or more memory storage units of the various embodiments disclosed herein can include an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Some examples of common operating systems can include Microsoft® Windows® operating system (OS), Mac® OS, UNIX® OS, and Linux® OS.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor and/or graphics processing unit (GPU), a digital signal processor, or any other type of processor or processing circuit capable of performing the desired functions. In some examples, the one or more processors of the various embodiments disclosed herein can include CPU 1910.

In the depicted embodiment of FIG. 19, various I/O devices such as a disk controller 1904, a graphics adapter 1924, a video controller 1902, a keyboard adapter 1926, a mouse adapter 1906, a network adapter 1920, and other I/O devices 1922 can be coupled to system bus 1914. Keyboard adapter 1926 and mouse adapter 1906 are coupled to a keyboard 1804 (FIGS. 18 and 19) and a mouse 1810 (FIGS. 18 and 19), respectively, of computer system 1800 (FIG. 18). While graphics adapter 1924 and video controller 1902 are indicated as distinct units in FIG. 19, video controller 1902 can be integrated into graphics adapter 1924, or vice versa in other embodiments. Video controller 1902 is suitable for refreshing a monitor 1806 (FIGS. 18 and 19) to display images on a screen 1808 (FIG. 18) of computer system 1800 (FIG. 18). Disk controller 1904 can control hard drive 1814

(FIGS. 18 and 19), USB port 1812 (FIGS. 18 and 19), and CD-ROM or DVD drive 1816 (FIGS. 18 and 19). In other embodiments, distinct units can be used to control each of these devices separately.

In some embodiments, network adapter 1920 can include and/or be implemented as a WNIC (wireless network interface controller) card (not shown) plugged or coupled to an expansion port (not shown) in computer system 1800 (FIG. 18). In other embodiments, the WNIC card can be a wireless network card built into computer system 1800 (FIG. 18). A wireless network adapter can be built into computer system 1800 (FIG. 18) by having wireless communication capabilities integrated into the motherboard chipset (not shown), or implemented via one or more dedicated wireless communication chips (not shown), connected through a PCI (peripheral component interconnector) or a PCI express bus of computer system 1800 (FIG. 18) or USB port 1812 (FIG. 18). In other embodiments, network adapter 1920 can include and/or be implemented as a wired network interface controller card (not shown).

Although many other components of computer system 1800 (FIG. 18) are not shown, such components and their interconnection are well known to those of ordinary skill in the art. Accordingly, further details concerning the construction and composition of computer system 1800 (FIG. 18) and the circuit boards inside chassis 1802 (FIG. 18) need not be discussed herein.

When computer system 1800 in FIG. 18 is running, program instructions stored on a USB drive in USB port 1812, on a CD-ROM or DVD in CD-ROM and/or DVD drive 1816, on hard drive 1814, or in memory 1908 (FIG. 19) can be executed by CPU 1910 (FIG. 19). A portion of the program instructions, stored on these devices, can be suitable for carrying out all or at least part of the techniques described herein. In various embodiments, computer system 1800 can be reprogrammed with one or more modules, applications, and/or databases, such as those described herein, to convert a general purpose computer to a special purpose computer. For purposes of illustration, programs and other executable program components are shown herein as discrete systems, although it is understood that such programs and components may reside at various times in different storage components of computing device 1800, and can be executed by CPU 1910. Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs.

Although predictive bi-adaptive streaming of real-time interactive CG content and authoring of real-time interactive CG content for predictive bi-adaptive streaming has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-19 may be modified, and that the foregoing discussion of certain of these embodiments does not necessarily represent a complete description of all possible embodiments. For example, one or more of the procedures, processes, or activities of FIGS. 10-17 can include different procedures, processes, and/or activities and be performed by many different modules, in many different orders, and/or one or more of the procedures, processes, or activities of FIGS. 10-17 may include one or more of the procedures, processes, or activities of another different one of FIGS. 10-17.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A player device comprising:
one or more processing modules in data communication with a server through a network; and
one or more non-transitory memory storage modules storing computing instructions configured to run on the one or more processing modules and perform:
playing a first interactive 3D simulation for a first 3D location of a computer graphics (CG) content clip for at least a first predetermined length of time, the CG content clip comprising a plurality of 3D locations renderable using a plurality of 3D assets each at a level of detail, and the plurality of 3D locations comprising the first 3D location;
while playing the first interactive 3D simulation and within the first predetermined length of time:
determining a first subset of the plurality of 3D assets to be downloaded for rendering two or more second 3D locations of the plurality of 3D locations, the two or more second 3D locations being selectable options for playback directly subsequent to playing the first interactive 3D simulation for the first 3D location;
adapting each of the levels of detail for one or more first 3D assets of the first subset of the plurality of 3D assets based at least in part on (a) a bandwidth for downloading the first subset of the plurality of 3D assets through the network, and (b) a processing power of the player device; and
downloading the first subset of the plurality of 3D assets at each of the levels of detail for the plurality of 3D assets, including each of the levels of detail, as adapted for the bandwidth and the processing power, for each of the one or more first 3D assets of the first subset of the
after the first predetermined length of time, receiving a selection for a selected 3D location of the two or more second 3D locations; and
playing a second interactive 3D simulation for the selected 3D location using at least a second subset of the first subset of the plurality of 3D assets, the second interactive 3D simulation being played devoid of delays for downloading and rendering the second interactive 3D simulation based on each of the levels of detail for the one or more first 3D assets that was adapted for the bandwidth and the processing power during the first predetermined length of time.

2. The player device of claim 1, wherein:
adapting each of the levels of detail for the one or more first 3D assets of the first subset of the plurality of 3D assets further comprises:
adapting each of the levels of detail for the one or more first 3D assets of the first subset of the plurality of 3D assets based at least in part on a current running average of the bandwidth.

3. The player device of claim 1, wherein:
adapting each of the levels of detail for the one or more first 3D assets of the first subset of the plurality of 3D assets further comprises:
determining whether the first subset of the plurality of 3D assets can be downloaded through the network within the first predetermined length of time when each of the levels of detail for each of the first subset of the plurality of 3D assets is a highest level of detail; and
if the first subset of the plurality of 3D assets cannot be downloaded through the network within the first predetermined length of time when each of the levels of detail for each of the first subset of the plurality of 3D assets is a highest level of detail, decreasing each of the levels of detail for the one or more first 3D assets of the first subset of the plurality of 3D assets until the first subset of the plurality of 3D assets can be downloaded within the first predetermined length of time.

4. The player device of claim 1, wherein:
adapting each of the levels of detail for the one or more first 3D assets of the first subset of the plurality of 3D assets further comprises:
using a bandwidth score for each of the levels of detail for the first subset of the plurality of 3D assets to determine whether the first subset of the plurality of 3D assets can be downloaded within the first predetermined length of time.

5. The player device of claim 1, wherein:
adapting each of the levels of detail for the one or more first 3D assets of the first subset of the plurality of 3D assets further comprises:
adapting each of the levels of detail for the one or more first 3D assets of the first subset of the plurality of 3D assets based at least in part on a current running average of the processing power of the player device.

6. The player device of claim 1, wherein:
adapting each of the levels of detail for the one or more first 3D assets of the first subset of the plurality of 3D assets further comprises:
determining whether a subset of the first subset of the plurality of 3D assets for rendering each of the two or more second 3D locations can be rendered within a predetermined framerate using each of the levels of detail, as currently set, for the subset of the first subset of the plurality of 3D assets; and
for each of the two or more second 3D locations, if the subset of the first subset of the plurality of 3D assets for rendering the second 3D location cannot be rendered within the predetermined framerate, decreasing each of the levels of detail for one or more 3D assets of the subset of the first subset of the plurality of 3D assets until the subset of the first subset of the plurality of 3D assets can be rendered within the predetermined framerate; and
the one or more first 3D assets comprise each of the one or more 3D assets of each of the subsets of the first subset of the plurality of 3D assets.

7. The player device of claim 1, wherein:
adapting each of the levels of detail for the one or more first 3D assets of the first subset of the plurality of 3D assets further comprises:
using a processing score for each of the levels of detail for the first subset of the plurality of 3D assets to determine whether each subset of the first subset of the plurality of 3D assets for rendering each of the two or more second 3D locations can be rendered within a predetermined framerate.

8. The player device of claim 1, wherein:
adapting each of the levels of detail for the one or more first 3D assets of the first subset of the plurality of 3D assets further comprises:
determining the one or more first 3D assets of the first subset of the plurality of 3D assets for adapting each of the levels of detail, based on priority levels of the first subset of the plurality of 3D assets.

9. The player device of claim 1, wherein:
determining the first subset of the plurality of 3D assets to be downloaded for rendering the two or more second 3D locations of the plurality of 3D locations further comprises:
determining one or more second 3D assets of the plurality of 3D assets for rendering the two or more second 3D locations that are already in a cache of the player device, such that the one or more second 3D assets are not included in the first subset of the plurality of 3D assets to be downloaded for rendering the two or more second 3D locations.

10. The player device of claim 1, wherein the computing instructions are further configured to perform:
after receiving the selection for the selected 3D location of the two or more second 3D locations, evicting from a cache of the player device a third subset of the first subset of the plurality of 3D assets, the third subset of the first subset of the plurality of 3D assets being devoid of any of the second subset of the first subset of the plurality of 3D assets.

11. The player device of claim 1, wherein:
determining the first subset of the plurality of 3D assets to be downloaded for rendering the two or more second 3D locations of the plurality of 3D locations further comprises:
using a location graph comprising a plurality of locations nodes each representing a different one of the plurality of 3D locations to determine the two or more second 3D locations of the plurality of 3D locations.

12. The player device of claim 11, wherein:
the location graph is a directed graph.

13. The player device of claim 11, wherein:
the location graph is a cyclic graph.

14. The player device of claim 1, wherein:
the level of detail for a first one of the plurality of 3D assets is different than a level of detail for a second one of the plurality of 3D assets.

15. A method being implemented on a player device via execution of computer instructions configured to run at one or more processing modules and configured to be stored at one or more non-transitory memory storage modules, the method comprising:
playing a first interactive 3D simulation for a first 3D location of a computer graphics (CG) content clip for at least a first predetermined length of time, the CG content clip comprising a plurality of 3D locations renderable using a plurality of 3D assets each at a level of detail, and the plurality of 3D locations comprising the first 3D location;
while playing the first interactive 3D simulation and within the first predetermined length of time:
determining a first subset of the plurality of 3D assets to be downloaded for rendering two or more second 3D locations of the plurality of 3D locations, the two or more second 3D locations being selectable options for playback directly subsequent to playing the first interactive 3D simulation for the first 3D location;
adapting each of the levels of detail for one or more first 3D assets of the first subset of the plurality of 3D assets based at least in part on (a) a bandwidth for downloading the first subset of the plurality of 3D assets from a server to the player device through a network, and (b) a processing power of the player device; and
downloading the first subset of the plurality of 3D assets at each of the levels of detail for the plurality of 3D assets, including each of the levels of detail, as adapted for the bandwidth and the processing power, for each of the one or more first 3D assets of the first subset of the plurality of 3D assets;
after the first predetermined length of time, receiving a selection for a selected 3D location of the two or more second 3D locations; and
playing a second interactive 3D simulation for the selected 3D location using at least a second subset of the first subset of the plurality of 3D assets, the second interactive 3D simulation being played devoid of delays for downloading and rendering the second interactive 3D simulation based on each of the levels of detail for the one or more first 3D assets that was adapted for the bandwidth and the processing power during the first predetermined length of time.

16. The method of claim 15, wherein:
adapting each of the levels of detail for the one or more first 3D assets of the first subset of the plurality of 3D assets further comprises:
adapting each of the levels of detail for the one or more first 3D assets of the first subset of the plurality of 3D assets based at least in part on a current running average of the bandwidth.

17. The method of claim 15, wherein:
adapting each of the levels of detail for the one or more first 3D assets of the first subset of the plurality of 3D assets further comprises:
determining whether the first subset of the plurality of 3D assets can be downloaded through the network within the first predetermined length of time when each of the levels of detail for the first subset of the plurality of 3D assets is a highest level of detail; and
if the first subset of the plurality of 3D assets cannot be downloaded through the network within the first predetermined length of time when each of the levels of detail for the first subset of the plurality of 3D assets is a highest level of detail, decreasing each of the levels of detail for the one or more first 3D assets of the first subset of the plurality of 3D assets until the first subset of the plurality of 3D assets can be downloaded within the first predetermined length of time.

18. The method of claim 15, wherein:
adapting each of the levels of detail for the one or more first 3D assets of the first subset of the plurality of 3D assets further comprises:
using a bandwidth score for each of the levels of detail for the first subset of the plurality of 3D assets to determine whether the first subset of the plurality of 3D assets can be downloaded within the first predetermined length of time.

19. The method of claim 15, wherein:
adapting each of the levels of detail for the one or more first 3D assets of the first subset of the plurality of 3D assets further comprises:
adapting each of the levels of detail for the one or more first 3D assets of the first subset of the plurality of 3D assets based at least in part on a current running average of the processing power of the player device.

20. The method of claim 15, wherein:
adapting each of the levels of detail for the one or more first 3D assets of the first subset of the plurality of 3D assets further comprises:
determining whether a subset of the first subset of the plurality of 3D assets for rendering each of the two or more second 3D locations can be rendered within a predetermined framerate using each of the levels of detail, as currently set, for the subset of the first subset of the plurality of 3D assets; and
for each of the two or more second 3D locations, if the subset of the first subset of the plurality of 3D assets for rendering the second 3D location cannot be rendered within the predetermined framerate, decreasing each of the levels of detail for one or more 3D assets of the subset of the first subset of the plurality of 3D assets until the subset of the first subset of the plurality of 3D assets can be rendered within the predetermined framerate; and
the one or more first 3D assets comprise each of the one or more 3D assets of each of the subsets of the first subset of the plurality of 3D assets.

21. The method of claim 15, wherein:
adapting each of the levels of detail for the one or more first 3D assets of the first subset of the plurality of 3D assets further comprises:
using a processing score for each of the levels of detail for the first subset of the plurality of 3D assets to determine whether each subset of the first subset of the plurality of 3D assets for rendering each of the two or more second 3D locations can be rendered within a predetermined framerate.

22. The method of claim 15, wherein:
adapting each of the levels of detail for the one or more first 3D assets of the first subset of the plurality of 3D assets further comprises:
determining the one or more first 3D assets of the first subset of the plurality of 3D assets for adapting each of the levels of detail, based on priority levels of the first subset of the plurality of 3D assets.

23. The method of claim 15, wherein:
determining the first subset of the plurality of 3D assets to be downloaded for rendering the two or more second 3D locations of the plurality of 3D locations further comprises:
determining one or more second 3D assets of the plurality of assets for rendering the two or more second 3D locations that are already in a cache of the player device, such that the one or more second 3D assets are not included in the first subset of the plurality of 3D assets to be downloaded for rendering the two or more second 3D locations.

24. The method of claim 15, further comprising:
after receiving the selection for the selected 3D location of the two or more second 3D locations, evicting from a cache of the player device a third subset of the first subset of the plurality of 3D assets, the third subset of the first subset of the plurality of 3D assets being devoid of any of the second subset of the first subset of the plurality of 3D assets.

25. The method of claim 15, wherein:

determining the first subset of the plurality of 3D assets to be downloaded for rendering the two or more second 3D locations of the plurality of 3D locations further comprises:

using a location graph comprising a plurality of locations nodes each representing a different one of the plurality of 3D locations to determine the two or more second 3D locations of the plurality of 3D locations.

26. The method of claim 25, wherein:

the location graph is a directed graph.

27. The method of claim 25, wherein:

the location graph is a cyclic graph.

28. The method of claim 15, wherein:

the level of detail for a first one of the plurality of 3D assets is different than a level of detail for a second one of the plurality of 3D assets.

\* \* \* \* \*